(12) United States Patent
Hu et al.

(10) Patent No.: US 11,307,165 B2
(45) Date of Patent: Apr. 19, 2022

(54) ELECTROCHEMICAL SENSORS WITH A CHEMICALLY ATTACHED MOLECULAR REDOX BUFFER

(71) Applicant: Regents of the University of Minnesota, Minneapolis, MN (US)

(72) Inventors: Jinbo Hu, Minneapolis, MN (US); Philippe Buhlmann, Minneapolis, MN (US); Andreas Stein, St. Paul, MN (US); Xue Zhen, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 464 days.

(21) Appl. No.: 15/655,457

(22) Filed: Jul. 20, 2017

(65) Prior Publication Data
US 2018/0024087 A1 Jan. 25, 2018

Related U.S. Application Data

(60) Provisional application No. 62/365,104, filed on Jul. 21, 2016.

(51) Int. Cl.
*G01N 27/333* (2006.01)

(52) U.S. Cl.
CPC .................................. *G01N 27/333* (2013.01)

(58) Field of Classification Search
CPC .. G01N 27/333; G01N 27/36; G01N 27/3335; G01N 27/34; G01N 27/40; G01N 27/401; G01N 27/403; G01N 27/4035
See application file for complete search history.

(56) References Cited

U.S. PATENT DOCUMENTS

| | | | |
|---|---|---|---|
| 7,666,380 B2 | 2/2010 | Jaroniec et al. | |
| 2015/0338367 A1* | 11/2015 | Hu | G01N 27/333 205/780 |

OTHER PUBLICATIONS

M. Pawlak, et al., Ferrocene Bound Poly(vinyl chloride) as Ion to Electron Transducer in Electrochemical Ion Sensors, Anal. Chem. 2010, 82, 6887-6894 (2010) (Year: 2010).*

(Continued)

*Primary Examiner* — Maris R Kessel
(74) *Attorney, Agent, or Firm* — Westman, Champlin & Koehler, P.A.; Z. Peter Sawicki; Amanda M. Prose

(57) ABSTRACT

Solid-contact electrodes include a molecular redox buffer that is covalently attached to one of the components of the electrodes. These electrodes can be incorporated into electrochemical sensor systems. The electrode components are an electron conductor, a membrane and optionally, an interlayer. The electrode includes covalent attachment of the molecular redox buffer to the interlayer, to the electron conductor or the membrane. The interlayer includes nanoporous carbon such as CIM-carbon. The molecular redox buffer includes a well-defined redox pair, e.g., a complex of Co(II)/Co(III). The electrodes are ion-selective electrodes (ISEs) or reference electrodes. Methods include constructing solid contact electrodes and using the electrodes in electrochemical sensor systems to determine the quantity of an analyte in a sample. The electrochemical sensor systems include disposable paper-based devices and/or wearable devices for measuring analytes in a sample.

25 Claims, 26 Drawing Sheets

(56) References Cited

OTHER PUBLICATIONS

F. Scholz et al A solid-state redox buffer as interface of solid contact ISEs, Electrochemistry Communications, vol. 12, pp. 955-957 (2010). (Year: 2010).*

D. Evrard, et al., Electrochemical functionalization of carbon surfaces by aromatic azide or alkyne molecules: a versatile platform for click chemistry. Chemistry—A European Journal, 14(30), 9286-9291 (2008) (Year: 2008).*

Devadoss et al., "Azide-Modified Graphitic Surfaces for Covalent Attachment of Alkyne-Terminated Molecules by "Click" Chemistry" J. Am. Chem. Soc. 2007, 129, 5370-5371, including supporting information.

Landis et al., "Covalent Grafting of Redox-Active Molecules to Vertically Aligned Carbon Nanofiber Arrays via "Click" Chemistry" Chem. Mater. 2009, 21, 724-730, including supporting information.

Yao et al., "Covalent Attachment of Catalyst Molecules to Conductive Diamond: C02 Reduction Using "Smart" Electrodes" J. Am. Chem. Soc. 2012, 134, 15632-15635, including supporting information.

Zou et al., "Calibration-Free Ionophore-Based Ion-Selective Electrodes With a Co(II)/Co(III) Redox Couple-Based Solid Contact" Anal. Chem. 2014, 86, 8687-8692.

Zou et al., "Ionic Liquid Reference Electrodes With a Well-Controlled Co(II)/Co(III) Redox Buffer as Solid Contact" Electroanalysis 2015, 27, 602-608.

Zou et al., "Solid Contact Ion-Selective Electrodes with a Well-Controlled Co(II)/ Co(III) Redox Buffer Layer" Anal. Chem., 2013, 85 (19), pp. 9350-9355.

Hu, J et al. "Ion-Selective Electrodes with Colloid-Imprinted Mesoporous Carbon as Solid Contact" Anal. Chem. 2014, 86, 7111-7118.

Hu, J. et al. "Paper-Based All-Solid-State Ion-Sensing Platform with a Solid Contact Comprising Colloid-Imprinted Mesoporous Carbon and a Redox Buffer" ACS Appl. Nano Mater. 2018, 1,293-301.

Mahmoud, A. E. D., et al. "Sustainable Synthesis of High-Surface-Area Graphite Oxide via Dry Ball Milling" ACS Sustainable Chem. Eng. 2018, 6, 6358-6369.

Hurvois, J.P., et al. "Reactivity of ferrocenium cations with molecular oxygen in polar organic solvents: Decomposition, redox reactions and stabilization" Journal of Organometallic Chemistry 690 (2005) 1829-1839.

* cited by examiner

CIM carbon attached with
Co(II/III) redox buffer

CIM carbon-N₃   CIM carbon-ferrocene

CIM-Co complex

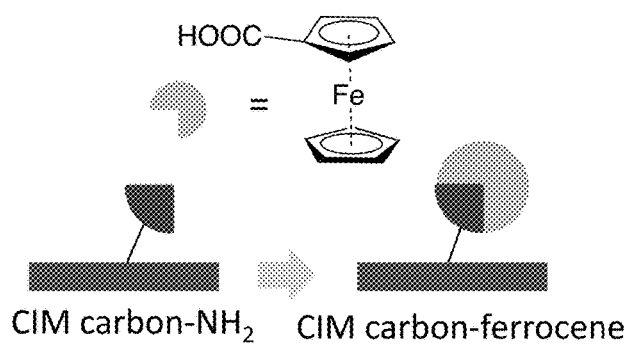
FIG. 13A
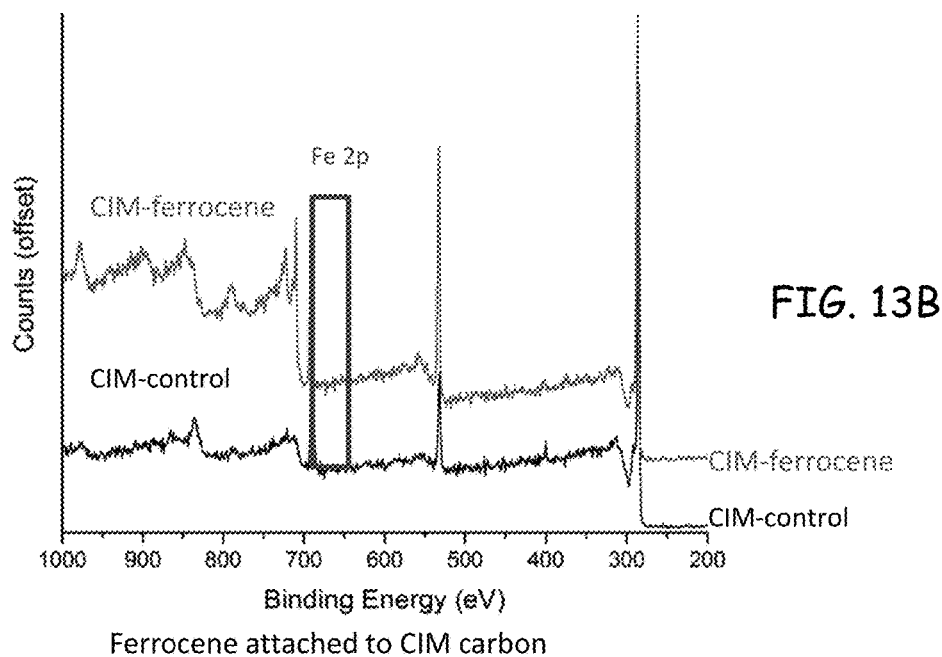
FIG. 13B
Ferrocene attached to CIM carbon
FIG. 13C
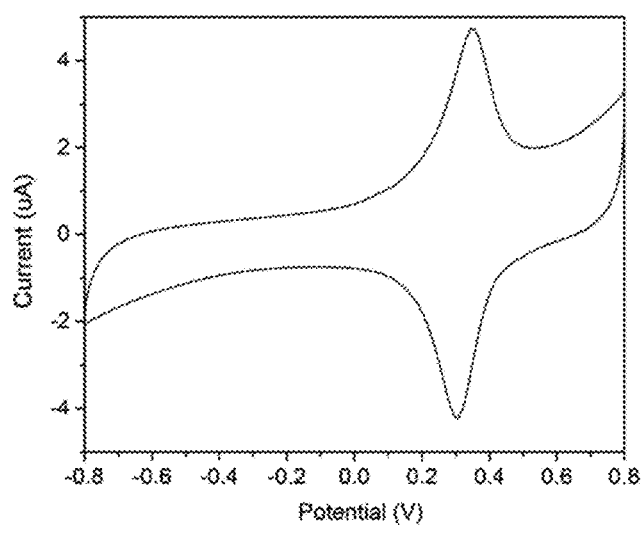
Ferrocene attached to glassy carbon

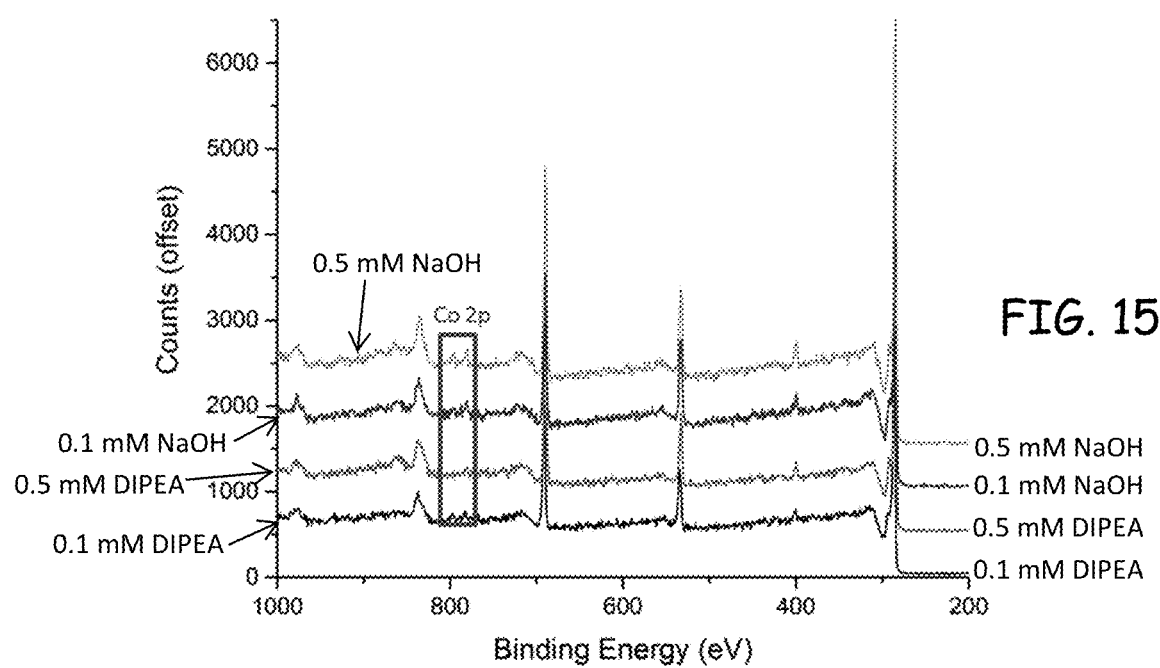

CIM carbon-NH₂    CIM-cobalt complex 5 individual electrodes, 0 h condition n = 4 (green trace excluded), 0 h and 19 h condition 0.5 mM cobalt bis(terpyridine) with
0.1 M TEABF$_4$ in acetonitrile EDC/HCl    HOBt    DIPEA    DMTMM

ELECTROCHEMICAL SENSORS WITH A CHEMICALLY ATTACHED MOLECULAR REDOX BUFFER

FIELD

The present description relates to electrochemical sensors and more specifically to electrodes and redox buffers.

BACKGROUND

Ion-selective electrodes (ISEs) are widely used in various application fields, including clinical analysis, process control, and environmental monitoring. To achieve sensor miniaturization, small sample volumes, easy maintenance, and scalability for mass production, solid-contact ion-selective electrodes (SC-ISEs), in which a solid contact is used as the ion-to-electron transducer, have attracted much attention. In view of the need for affordable and portable analytical devices for small sample volumes, miniaturizable SC-ISEs are highly desirable.

The simplest possible electrochemical cell for an electroanalytical measurement comprises a measuring electrode, such as an ISE, and one reference electrode. Conventional reference electrodes are typically Ag/AgCl or Hg/Hg$_2$Cl$_2$ half cells and are connected to the sample through a salt bridge. The latter usually contains an aqueous solution of an equitransferent salt that minimizes the liquid junction potential at the interface of the bridge electrolyte and the sample. Although very stable and reliable, such reference electrodes exhibit disadvantages owing to the presence of the salt bridge, such as the need for frequent maintenance, a large size, and the mutual contamination of the bridge electrolyte and sample.

SUMMARY

In one aspect, the present description includes a solid-contact electrode. The solid-contact electrode includes a molecular redox buffer covalently attached to one of the components of the electrode. The components of the electrode include a solid electron conductor and a membrane. The components of the electrode may further include an interlayer with nanoporous carbon, wherein the interlayer is located between the solid electron conductor and the membrane. The molecular redox buffer may be covalently attached to the interlayer, the membrane or the electron conductor. The nanoporous carbon may be colloid-imprinted mesoporous (CIM) carbon. The average diameter of the pores in the carbon interlayer may be between about 0.2 nm and about 1 μm. The molecular redox buffer includes the reduced and oxidized species of a redox couple. The redox couple may be selected from $Co^{2+}/Co^{3+}$, $Os^{2+}/Os^{3+}$, $Fe^{2+}/Fe^{3+}$, $Cu^+/Cu^{2+}$, $Ni^{2+}/Ni^{3+}$, $Mn^{2+}/Mn^{3+}$, $Cr^{2+}/Cr^{3+}$, $Ru^{2+}/Ru^{3+}$, $Mo^{4+}/Mo^{5+}$, $Ag^+/Ag^{2+}$, $Ag^{2+}/Ag^{3+}$, $Sn^{2+}/Sn^{4+}$, $Ir^{2+}/Ir^{3+}$ and $Pb^{2+}/Pb^{4+}$. The molecular redox buffer may be attached to the interlayer using a reactive functional group. The reactive functional group may be selected from azide (—N$_3$), thiol (—SH), trichlorosilanes, trialkoxysilanes, amine, vinyl, styryl, allyl, haloalkyl, epoxide, isocyanate and silazane and wherein the linkages formed are ester linkages, amide linkages, carbon-carbon linkages or carbon-silicon linkages. The molecular redox buffer may include tris(bipyridine) complexes, bipyridine complexes, phenanthroline complexes, phthalocyanine complexes, porphyrin complexes, or other chemically stable complexes of $Co^{2+}/Co^{3+}$, $Os^{2+}/Os^{3+}$, $Fe^{2+}/Fe^{3+}$, $Cu^+/Cu^{2+}$, $Ni^{2+}/Ni^{3+}$, $Mn^{2+}/Mn^{3+}$, $Cr^{2+}/Cr^{3+}$, $Ru^{2+}/Ru^{3+}$, $Mo^{4+}/Mo^{5+}$, $Ag^+/Ag^{2+}$, $Ag^{2+}/Ag^{3+}$, $Sn^{2+}/Sn^{4+}$, $Ir^{2+}/Ir^{3+}$ and $Pb^{2+}/Pb^{4+}$. The solid electron conductor may be selected from gold, platinum, silver, copper, steel, carbon, nickel, brass, indium-tin-oxide (ITO), fluorine-doped tin oxide (FTO), aluminum and combinations thereof.

The solid-contact electrode may be incorporated into or within an electrochemical sensor system having two or more electrodes. At least one of the electrodes is the solid-contact electrode and may be an ion-selective electrode with an ion-selective membrane. At least one of the electrodes is the solid-contact electrode that may be a reference electrode with a reference membrane. The electrochemical sensor system may include at least two of the solid-contact electrodes wherein both the reference and the ion-selective electrodes are the solid-contact electrodes. The ion-selective membrane may be designed to respond to analytes selected from $H^+$, $Li^+$, $Na^+$, $K^+$, $Mg^{2+}$, $Ca^{2+}$, $Cu^{2+}$, $Ag^+$, $Zn^{2+}$, $Cd^{2+}$, $Hg^{2+}$, $Pb^{2+}$, $NH_4^+$, carbonate, bicarbonate, nitrate, nitrite, sulfide, phosphate, chloride, iodide, perfluoroalkylsulfonates, perfluoroalkanoates and the like.

In another aspect, the present description includes an electrochemical sensor system comprising one or more electrodes, wherein at least one of the electrodes is a solid-contact electrode. The solid-contact electrode includes a molecular redox buffer covalently attached to one of the components of the electrode. The components of the electrode include a solid electron conductor and a membrane. The components of the electrode may further include an interlayer with nanoporous carbon, wherein the interlayer is located between the solid electron conductor and the membrane and wherein the molecular redox buffer is covalently attached to the interlayer, the membrane or the electron conductor. The system may include 2, 3, 4 or more solid-contact electrodes. The system may include one of the solid-contact electrodes as a reference electrode and a second solid-contact electrode as an ion-selective electrode, wherein the reference electrode further comprises a solid electron conductor and a reference membrane and the ion-selective electrode further comprises a solid electron conductor and an ion-selective membrane. The system may be a paper-based electrochemical system comprising a reference electrode and an ion-selective electrode. The system may measure the analytes selected from H+, $Li^+$, $Na^+$, $K^+$, $Mg^{2+}$, $Ca^{2+}$, $Cu^{2+}$, $Ag^+$, $Zn^{2+}$, $Cd^{2+}$, $Hg^{2+}$, $Pb^{2+}$, $NH_4^+$, carbonate, bicarbonate, nitrate, nitrite, sulfide, phosphate, chloride, iodide, perfluoroalkylsulfonates, perfluoroalkanoates and the like. The system may include two solid-contact electrodes, wherein the system is a desktop system, a wearable system, an implantable system, a printed system, a 3-D printed system or combinations thereof.

In a further aspect, the present description includes a method of making a solid-contact electrode. The method includes covalently attaching a molecular redox buffer to one of the components of a solid-contact electrode, wherein the components include a solid electron conductor and a membrane. The components may further include an interlayer with nanoporous carbon, wherein the interlayer is disposed between and in contact with the solid electron conductor and the membrane. The molecular redox buffer may be covalently attached to the interlayer, membrane or the electron conductor. The nanoporous carbon may be colloid-imprinted mesoporous (CIM) carbon. The method may include synthesizing the molecular redox buffer complex prior to coupling to one of the components of the electrode. The method may include the stepwise synthesis of the molecular redox buffer by addition of reactant monomers to the interlayer that has been modified with a reactive functional group.

In yet a further aspect, the present description includes a method of measuring an analyte in a sample. The method includes contacting an ion-selective electrode in an electrochemical system with a sample, wherein the electrochemical system includes at least one solid-contact electrode. The solid-contact electrode includes a molecular redox buffer covalently attached to one of the components of the electrode. The components of the electrode include a solid electron conductor and a membrane. The components of the electrode may further include an interlayer with nanoporous carbon, wherein the interlayer is located between the solid electron conductor and the membrane and wherein the molecular redox buffer is covalently attached to the interlayer, the membrane or the electron conductor. The nanoporous carbon may be colloid-imprinted mesoporous (CIM) carbon. The sample may be a clinical sample, an industrial sample, a forensic sample, an agricultural sample, a residential sample, a bodily fluid sample, or an environmental sample. The electrochemical system may be a sensor, wherein the sensor is a potentiometric sensor, ion-sensitive field effect transistor, a voltammetric sensor, an amperometric sensor, a coulometric sensor, or an impedance sensor. The method may further comprise correlating the results from the sensor to determine the quantity or concentration of the analyte.

BRIEF DESCRIPTION OF THE DRAWINGS

FIG. 13A is a schematic diagram of the attachment of ferrocene to CIM carbon by amide coupling.

FIG. 13B is a graph of the XPS spectral results for ferrocene attachment to CIM carbon by amide coupling.

FIG. 13C is a plot of a CV for ferrocene attachment to glassy carbon by amide coupling.

FIG. 15 is a graph of XPS spectral results of coupling between CIM-$NH_2$ and cobalt(III) meso-tetra (4-carboxyphenyl) porphyrin using different types and amounts of bases.

DETAILED DESCRIPTION OF ILLUSTRATIVE EMBODIMENTS

Figure 1A:
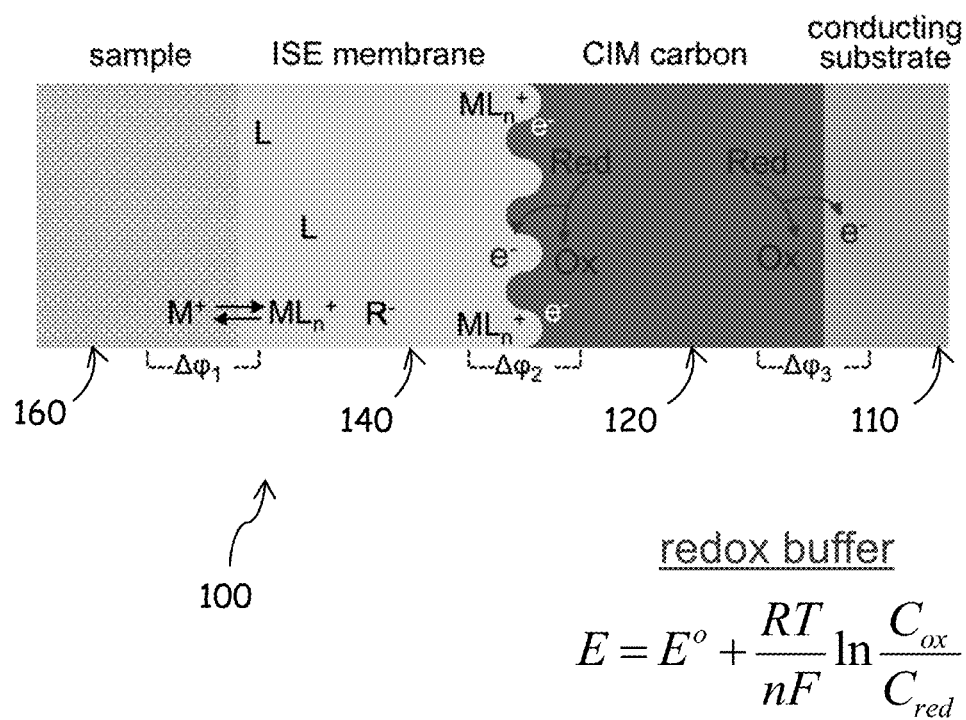
FIG. 1A is a schematic diagram of an electrode with a colloid-imprinted mesoporous (CIM) carbon-based redox buffer.

The present description includes electrodes with a molecular redox buffer chemically attached to one of the components of the electrode. The electrode components can include an electron conductor, a membrane and, optionally, an intermediate layer. The intermediate layer, when present, is located between the electron conductor and the membrane. The redox buffer can be a molecular redox buffer chemically attached to the electron conductor, the intermediate layer or the membrane. In one embodiment, the electrode includes an intermediate layer with a chemically attached molecular redox buffer located between the electron conductor and the membrane.

The redox buffer is a molecular redox buffer having the oxidized species and the reduced species of a well-defined redox couple, e.g. $Co^{2+}/Co^{3+}$, incorporated into the redox buffer molecules. The molecular redox buffer may exhibit redox activity at one specific potential. The intermediate layer may include nanoporous carbon. The membrane can be an ion-selective membrane for an ion-selective electrode or a reference membrane for a reference electrode.

The electrode can be a solid-contact (SC) electrode such as a solid-contact ion-selective electrode (SC-ISE) that uses, for example, nanoporous carbon as the intermediate layer or interlayer between a solid electron conductor and an ion-selective membrane (ISM). A redox buffer including both the oxidized species and the reduced species of a redox couple can be covalently attached to the interlayer. The electrode may be a solid-contact (SC) reference electrode that uses nanoporous carbon as the interlayer between a solid electron conductor and a reference membrane (RM). The SC-ISE and/or the SC-reference electrode with a covalently attached redox buffer can be part of electrochemical sensing devices.

The electrodes with the covalently attached molecular redox buffer described herein, advantageously, exhibit long term stability of the electrode measurements without the need for calibration in short-term applications and either minimizing or completely eliminating the need for calibration in long-term applications. These electrodes can be less bulky and easier to manufacture. These electrodes can also be used to make printable electrochemical sensor systems. These electrodes may also be used to make wearable systems.

The present description includes electrochemical systems or devices having one or more electrodes with molecular redox buffer chemically attached to the interlayer, the membrane or the electron conductor. These systems may include, for example, SC-ISE, a sample holder and circuitry and equipment to measure, record and/or compute the information generated from the sample analyses to identify the quantity or concentration of an analyte in the sample. The systems may also include a SC reference electrode. The systems may include multiple electrodes.

In one embodiment, the electrochemical system includes at least one electrode with chemically attached molecular redox buffer. In another embodiment, the electrochemical system includes two or more electrodes with chemically attached molecular redox buffer. The present description also includes methods of making electrodes with chemically attached molecular redox buffer and also methods for using the electrodes with the chemically attached molecular redox buffer for determining the quantity or concentration of an analyte in a sample.

"Solid-contact" (SC) as referred to herein can relate to the electron conductor with an interlayer placed over the electron conductor and a membrane placed over the interlayer. Alternatively, the membrane may be placed over the electron conductor without the interlayer.

"Solid-contact electrodes" as referred to herein includes electrodes with a chemically attached redox buffer. The redox buffer is chemically attached to one of the components of the electrode. The redox buffer may be attached to the electron conductor, the interlayer and/or to the membrane.

"Electron conducting material" may also be referred to herein as "electron conductor" or "substrate" and these terms are equivalent and may be used interchangeably.

"Intermediate layer" and "interlayer" as referred to herein are interchangeable and relate to a layer between the electron conductor and a membrane.

"Redox couple" as referred to herein relates to a reduced species and the corresponding oxidized species such as Co(II)/Co(III), Os(II)/Os(III), $Fe^{2+}/Fe^{3+}$, $Cu^+/Cu^{2+}$ and the like.

"Redox buffer" and "Molecular redox buffer" as referred to herein relates to complex ions/molecules that comprise the oxidized and reduced species of a redox couple and that maintain a stable and reproducible potential in the presence of oxidizing or reducing impurities or when small electrical currents pass through an electrochemical cell. The molecular redox buffer exhibits redox activity at one specific potential. "Redox buffer" and "molecular redox buffer" as referred to herein are equivalent and will be used interchangeably.

"Reduced buffer complex" as referred to herein relates to a reduced component of the redox buffer that includes the reduced species of the redox couple attached to the interlayer.

"Oxidized buffer complex" as referred to herein relates to an oxidized component of the redox buffer that includes the oxidized species of the redox couple.

"Ligand" as referred to herein can bind to either the reduced species and/or the oxidized metal of a redox couple. The ligand may form complexes of 1:1, 2:2, 3:1, 4:1, 5:1, 6:1, 7:1 or 8:1 stoichiometry with the reduced species or the oxidized species to form the reduced or oxidized complex ion/molecule of the molecular redox buffer. A redox buffer complex ion/molecule may also comprise more than one type of ligand.

"Click chemistry" as referred to herein relates to copper(I) catalyzed azide-alkyne cycloaddition reactions that are high yielding, wide in scope, are stereospecific, simple to perform, and can be conducted in easily removable or benign solvents.

"Nanoporous" as referred to herein includes materials having a pore size of less than about 1000 nm. Nanoporous includes microporous materials (average pore size between about 0.2 nm and about 2 nm), mesoporous materials (average pore size between about 2 nm and about 50 nm) and macroporous materials having an average pore size of between about 50 nm about 1 µm.

"Macroporous materials" as referred to herein includes materials with an average pore size above 50 nm.

"Nanoporous carbon" as referred to herein includes microporous carbon, mesoporous carbon and macroporous carbon having the above stated average pore sizes.

"Chemical attachment" as referred to herein includes all chemical modifications including covalent attachment and attachments based on van der Waals interactions, hydrogen bonds, pi-pi stacking interactions, electrostatic interactions and the like.

"Covalent attachment" as referred to herein relates to the formation of a covalent bond.

"Linkers" as referred to herein relate to entities consisting of multiple atoms that are used to link two components, e.g., the interlayer to the molecular redox buffer.

"Reactive functional groups" as referred to herein relates to functional groups that are used to modify or functionalize the interlayer, membrane or the electron conductor.

"Functionalized" as referred to herein relates to the addition of functional groups to the interlayer, membrane or the electron conductor in order to carry out further chemical reactions to chemically attach the redox buffer.

"Co(II)/Co(III)" and "$Co^{2}/Co^{3+}$" as referred to herein are interchangeable and relate to the indicated ionized stated of cobalt.

A "chemical redox" reaction as referred to herein relates to oxidation and reduction of the redox couple driven by chemical reactions.

An "electrochemical redox" reaction as referred to herein relates to oxidation and reduction of the redox couple driven by external application of current or voltage.

In one embodiment, the present description can include solid-contact electrodes with chemically attached molecular redox buffers. The SC electrodes can include an electron conducting material, an optional intermediate layer, and a membrane. The present description will refer to covalently attached molecular redox buffers, however other types of chemical modifications such as van der Waals interactions, hydrogen bonds, pi-pi interactions, electrostatic interactions, and the like are also included and within the scope of this description.

In one embodiment, colloid imprinted mesoporous (CIM) carbon can be used as a nanoporous carbon interlayer material in solid-contact electrodes. CIM carbon is described, for example, in U.S. Pat. No. 7,666,380 issued to Jaroniec et al., incorporated herein in its entirety by reference. The colloid imprinting makes it possible to prepare a carbon material that exhibits a very high surface area, giving the resulting electrochemical devices a very high capacitance and, thereby, a very large resistance to potential drift. This results in an exceptionally high long-term stability of the sensor signal. Moreover, since CIM carbon can be prepared from oxygen free hydrocarbon precursors (such as mesophase pitch), this material lacks the high concentration of surface functional groups and other impurities characteristic of many other high surface area carbon materials.

In embodiments described herein, attachment of the redox buffer to the interlayer will be described but it will be understood that the attachment of the redox buffer may be to the other components of the electrode, e.g. membrane or the electron conductor. In some embodiments described herein, the interlayer in the electrodes is described as CIM carbon. It is understood that other interlayers may be used in the electrodes and all are within the scope of this description.

The chemical, e.g. covalent, attachment of a redox buffer onto at least one of the components of the electrode can result in the availability of a well-defined redox couple in the electrodes. The redox buffer includes molecules with both the reduced and oxidized species of the redox couple to improve the reproducibility and repeatability of the calibration curve of multiple identically prepared sensors. The electrodes with the chemically attached redox buffers can be used, for example, in electrochemical sensor systems.

In one embodiment, the electrochemical sensing system can be a disposable paper-based potentiometric sensing device. The paper-based system can include a SC reference electrode and a printed ion selective electrode as further described below. The paper-based system can include a SC-ISE with covalently attached molecular redox buffer as described herein.

In one embodiment, the present description can include a SC-ISE with a nanoporous carbon interlayer, e.g. a CIM carbon interlayer. A SC-ISE can be prepared with an ion-selective ionophore-doped polymeric membrane. A SC-ISE can include a solid electron conductor, an interlayer including nanoporous carbon with covalently attached molecular redox buffer, and an ion-selective membrane including a polymer.

In an embodiment, the present description can include a SC-reference electrode with a nanoporous carbon interlayer, e.g. a CIM carbon interlayer. A SC-reference electrode with a polymeric reference membrane can be prepared in a manner similar to those of ion-selective electrodes described herein. A SC-reference electrode includes a solid electron conductor, an interlayer including nanoporous carbon with covalently attached molecular redox buffer, and a polymeric reference membrane. The measurement with a SC-reference electrode can be calibration-free.

In various embodiments, the present description can include SC—ISEs and/or SC-reference electrodes that can include chemically attached molecular redox buffers to electron conductor, to an ion-selective membrane or to a reference membrane.

The size and/or shape of the electrodes can vary depending on the specific use, and all are within the scope of this description. The electrodes may be configured for home or point-of-care use, for use as a wearable device, and for use at a hospital, clinic or other similar settings. This may include miniaturization of the electrodes. The electrode, for example, can be a planar device in which the solid electron conductor, an interlayer comprising nanoporous carbon, and a membrane are applied as consecutive layers on an inert substrate, such as plastic, silicon or paper. The electrodes may be paper-based systems. These electrodes may be disposable and miniaturized.

Table 1 below indicates desirable sensor ranges and acceptable errors for potassium, chloride and sodium measurements in blood. The sensors described herein have electrodes with reproducible electrode E° and can also have improved sensor stability by having, for example, a drift of less than 1 mV in 5 days. The sensors may also have improved sensitivity and selectivity. The sensors can also have interfacial potentials that are well-controlled.

TABLE 1

| Analyte | Range (mM) | Acceptance error* | Acceptable error in mV |
|---|---|---|---|
| Potassium | 3.4-5.3 | ±0.5 mM | 2.8 |
| Chloride | 96-106 | ±5% | 1.4 |
| Sodium | 133-144 | ±4 mM | 0.7 |

*U.S. Federal Regulation (Clinical Laboratory Improvements Act, 42 CFR 493.931)

FIG. 1 is a schematic representation of the components of one embodiment of an electrode described herein. In FIG. 1, electrode 100 includes electron conductor 110, interlayer 120, membrane 140, and sample 160. Membrane 140 may be an ion-selective membrane (ISM) or a reference membrane. In embodiments where electrode 100 is an ISE, membrane 140 is an ISM. Alternatively, in embodiments where electrode 100 is a reference electrode, membrane 140 is a reference membrane. Interlayer 120 is disposed between conductor 110 and membrane 140. In some embodiments, solid electron conductor 110 is a disk, for example, a gold disk.

In one embodiment shown in FIG. 1, electrode 100 is a SC-ISE. Electron conducting layer 110 can be, for example, gold. Interlayer 120 can be a CIM carbon interlayer with covalently attached redox buffer as shown. Electrode 100 is in contact with sample 160 in order to analyze the presence of an ion in sample 160. The ion may be a monovalent, cation, $M^+$, as shown in FIG. 1. The ion that is being sensed does not have to be a monovalent cation as shown in FIG. 1 but it may be either a cation or an anion, and it may be singly charged or multiply charged. Membrane 140 is an ion selective membrane that is permeable to the ion that is being sensed. In FIG. 1, L is an ionophore that can selectively complex with $M^+$ to form $ML_n^+$, and $R^-$ is an ionic site to provide membrane permselectivity. The ionophore may be electrically neutral or it may have a positive or negative charge. The ionic site may have a positive or a negative charge. The interfacial potential at sample 160/membrane 140 interface ($\Delta\varphi_1$) is defined by the distribution of the ion that is being sensed between sample 160 and membrane 140. The interfacial potentials at membrane 140/interlayer 120 interface ($\Delta\varphi_2$) and at interlayer 120/electron conducting layer 110 interface ($\Delta\varphi_3$) are defined by the redox buffer. The potential of the redox buffer is controlled by the ratio of its oxidized and reduced species, as described in the Nernst equation in FIG. 1. The potential of electrode 100 is the sum of all the interfacial potentials within the electrode, and can be controlled by the ratio of oxidized and reduced species in the redox buffer.

Solid electron conductor 110 can include a variety of conducting materials. Exemplary conducting materials include gold, silver, platinum, copper, steel, brass, nickel, indium-tin-oxide (ITO), fluorine-doped tin oxide (FTO), aluminum, carbon such as glassy carbon, carbon paste, carbon ink, graphene, graphite and the like. In one embodiment, electrode 100 includes a gold disk as conductor 110. The thickness and the diameter of the conductor can vary. The gold disk, for example, can have a diameter of between about 0.5 mm and about 5 mm. Diameters outside of this range are also within the scope of this description. In one embodiment, the diameter of the gold disk is about 2 mm.

In one embodiment, electron conductor 110 can be a nanostructured material. Nanostructured electron conductors can be modified to chemically attach a molecular redox buffer as described below. In electrodes with nanostructured electron conductors, the interlayer can be eliminated and a membrane can be placed over the nanostructured electrode conductor with the chemically attached redox buffer.

In one embodiment, SC-electrodes described herein can include interlayer 120 disposed over and in contact with the solid electron conductor 110. Interlayer 120 can include a variety of materials including nanoporous materials. Nanoporous materials can be materials such as nanoporous carbon, nanoporous metals, nanoporous conductive polymers and the like. Nanoporous materials can include microporous materials with an average size between about 0.2 nm and about 2 nm, mesoporous materials with an average size between about 2 nm and about 50 nm and macroporous materials with an average size between about 50 nm and about 1 µm.

In one embodiment, interlayer 120 can include nanoporous carbon. Nanoporous carbon can include microporous carbon with an average size between about 0.2 nm and about 2 nm, mesoporous carbon with an average size between about 2 nm and about 50 nm and macroporous carbon with an average pore size of between about 50 nm and about 1 µm.

In one embodiment, the electrodes can include CIM carbon as the interlayer disposed over the electron conductor. CIM carbon can exhibit open and interconnected pores that can form a bicontinuous ion- and electron-conducting structure. CIM carbon may be synthesized by employing a colloidal imprinting method and used to fabricate electrodes as described, for example, in United States Publication No. 2015/0338367 by Hu et al. incorporated herein in its entirety by reference. The CIM carbon may be milled, e.g. ball milled, to generate a desired size. The CIM carbon may also be sonicated to generate the desired particle size. Sonication can include bath sonication and/or probe sonication. CIM carbon with desirable particle sizes may also be generated by a combination of milling and sonication. Other methods of generating the desired size of CIM carbon are also within the scope of this description.

The interlayer may also include nanostructured carbon materials such as three-dimensionally ordered macroporous (3DOM) carbon, carbon nanotubes, fullerene, and graphene. SC-ISEs based on these carbon materials can have favorable long-term potential stability.

The interlayer in the electrodes is generally a thin film of varying thickness. The thickness of the interlayer can be, for example, between about 0.5 µm and about 1000 µm. In one exemplary embodiment, the interlayer is between about 50 µm about 250 µm. Interlayer thickness can depend on the specific use and may also be outside of this range and all are within the scope of this description.

The membranes of the electrodes can be made from a variety of polymeric matrices. Suitable polymers for membranes useful in an electrode are known in the art and all are within the scope of this description. The polymeric matrix can be, for example, polyvinyl chloride (PVC), polyurethane, silicone rubbers, polyvinyl butyral, polyacrylate, a perfluoropolymer and the like.

The ion-selective electrodes (ISEs) described herein also include an ion-selective membrane (ISM) disposed over and in contact with the interlayer or the electron conductor. In some embodiments, the molecular redox buffer may be covalently attached to the ISM. A variety of ISM's are known to be functional in electrochemical sensors and all are within the scope of this description. Exemplary ISM's include membranes with selectivity for $H^+$, $Li^+$, $Na^+$, $K^+$, $Mg^{2+}$, $Ca^{2+}$, $Cu^{2+}$, $Ag^+$, $Zn^{2+}$, $Cd^{2+}$, $Hg^{2+}$, $Pb^{2+}$, $NH_4^+$, carbonate, bicarbonate, nitrate, nitrite, sulfide, phosphate, chloride, iodide, and the like, as well as organic anions and cations such as heparin, protamine, perfluoroalkylsulfonates, perfluoroalkanoates and the like. In some embodiments, the ISM's are ionophore-doped. Exemplary ionophore doped ISMs include $K^+$-ISMs doped with valinomycin, $H^+$-ISMs with pyridine or trialkylamine derivatives as ionophores, $Li^+$, $Na^+$, and $K^+$-ISMs with crown ether, calixarene, or oligoamide ionophores, and carbonate ISEs with trifluoroacetylphenone derivatives as ionophores as known in the art. The thickness of the ISMs can vary and is generally determined by the desired use. In some exemplary embodiments, ISM thickness can be between about 20 μm and about 500 μm. In some embodiments the ISM thickness is about 100 μm. ISM thicknesses outside of this range are also within the scope of this description.

In embodiments including SC-reference electrodes, the reference membrane may be a hydrophobic reference membrane attached to an electronically conducting solid contact, thus resembling the setup of an SC-ISE. An interlayer may be present between the electron conductor and the reference membrane. The reference membranes are usually doped with ions that can leach into the samples on a slow but continuous basis so that the phase boundary potentials at the reference membrane/sample interfaces are sample-independent and defined by the interfacial distribution of the doping ions. Several ions can be doped into reference membranes, including polyions, ionic liquids, and lipophilic and hydrophilic salts. At the reference membrane/solid contact interface, the interfacial potential can be stabilized by employing various solid contacts that are also used in SC-ISEs as described herein. The SC-reference electrodes can have a high capacitive interface between the reference membrane and the solid contact and the solid contact can provide for a high potential stability. Advantageously, light and oxygen do not significantly affect the SC-reference electrodes. The measurement with a reference electrode using the CIM carbon may be calibration-free.

The solid contacts for SC-reference electrodes can also include conducting polymers, and nanostructured carbon materials, such as three-dimensionally ordered macroporous (3DOM) carbon, carbon nanotubes, and graphene.

The solid contact electrodes described herein can be combined with a variety of redox buffers to enhance the potential stability. In an embodiment, the redox buffers are molecular redox buffers that are chemically attached, e.g. covalently attached, to one of the components of the electrodes, the interlayer, membrane or to the electron conductors.

In the present description, it is understood that references to covalent attachment can also include other types of chemical attachment and references to attachment of redox buffer to the interlayer may also relate to and include attachment of redox buffer to the electron conductor or membrane.

Figure 2A:
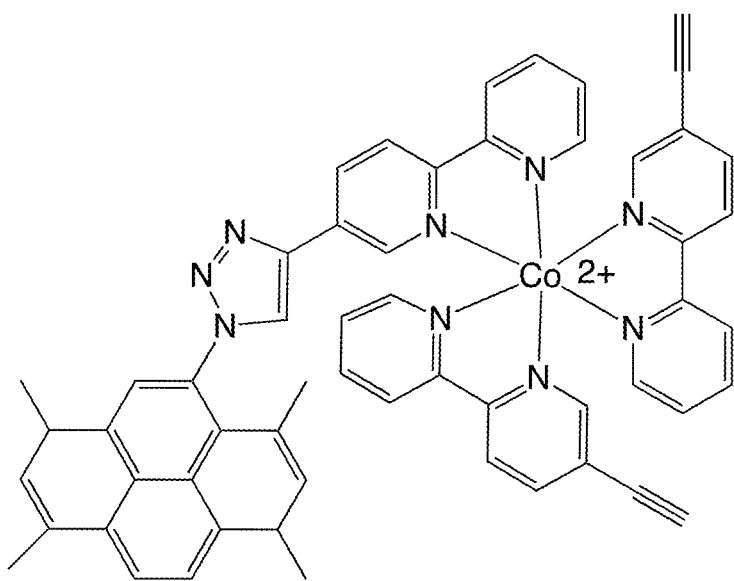
FIG. 2A is a representative structure of a cobalt (II) complex attached to CIM carbon through a triazole linker.
Figure 2B:
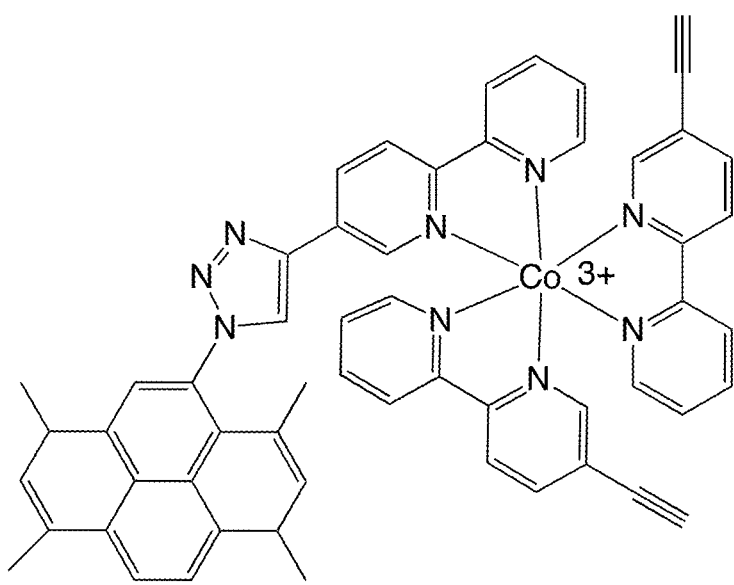
FIG. 2B is a representative structure of a cobalt (III) complex attached to CIM carbon through a triazole linker.

Redox buffers that can be used for chemical attachment can include any well-defined redox active pair of a reduced organic or organometallic complex along with the oxidized species that is formed by removal of one or more electrons from the reduced species, provided that both the reduced and the oxidized species are chemically stable when attached to the interlayer or another electrode componenet. By having both the reduced and the oxidized species present, a redox buffer is created that helps to stabilize the interfacial potential. FIG. 2A and FIG. 2B show one embodiment of reduced and oxidized species, respectively, of a molecular redox buffer attached to CIM carbon using azide as the linker.

The molecular redox buffers can include a variety of oxidized species and reduced species of well-defined redox couples. The redox couples can be transition metal ions or other metal ions such as $Co^{2+}/Co^{3+}$, $Os^{2+}/Os^{3+}$, $Fe^{2+}/Fe^{3+}$, $Cu^+/Cu^{2+}$, $Ni^{2+}/Ni^{3+}$, $Mn^{2+}/Mn^{3+}$, $Cr^{2+}/Cr^{3+}$, $Ru^{2+}/Ru^{3+}$, $Mo^{4+}/Mo^{5+}$, $Ag^+/Ag^{2+}$, $Ag^{2+}/Ag^{3+}$, $Sn^{2+}/Sn^{4+}$, $Ir^{2+}/Ir^{3+}$ and $Pb^{2+}/Pb^{4+}$ and the like. Other redox couples may be used and all are within the scope of this description. The oxidized species and the reduced species of the redox couple can be incorporated complexed with the ligands to form the redox buffer. The ligands complexed with the reduced and oxidized species may be the same or they may be different.

Molecular redox buffers and methods of making molecular redox buffers are described, for example, in Zou et al. Anal. Chem. 2013, 85, 9350-9355 and Zou et al. *Anal. Chem.,* 2014, 86, 8687-8692., and incorporated herein by reference. In various embodiments, these molecular redox buffer can be covalently attached in the electrode components as described herein.

Figure 1B:
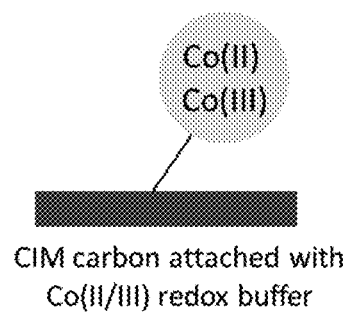
FIG. 1B is a schematic diagram of a molecular redox buffer attached to the interlayer.

In one embodiment, the redox couple Co(II)/Co(III) can be attached to the interlayer, e.g. a CIM carbon interlayer. A Co(II) complex can be attached to the interlayer to form the reduced component of the redox buffer and a Co(III) complex can be attached to the interlayer to form the oxidized component of the redox buffer. FIG. 1B is a schematic diagram of one embodiment of an interlayer, e.g. CIM carbon, functionalized by a linker, e.g. azide, for attachment of a molecular redox buffer with the redox couple Co(II)/Co(III) to the interlayer.

Reactive functional groups can be used to modify the interlayer, membrane or the nanostructured electron conductor to facilitate the chemical attachment or coupling of the molecular redox buffers to the interlayer, membrane or the electron conductor. The reactive functional groups act as linkers, for example, between the interlayer and the molecular redox buffer. A variety of reactive functional groups can be used. The selection of the reactive functional group can be dependent on the composition of the interlayer, membrane or the electron conductor. The reactive functional groups act as linkers and can include, for example, azide (—$N_3$), thiol (—SH), trichlorosilanes, trialkoxysilanes, ester linkages, amide linkages, and the like. Other reactive functional groups are also within the scope of this description. The use of the linkers can form, for example, ester linkages, amide linkages, carbon-carbon linkages or carbon-silicon linkages and the like.

The azide coupling reaction, for example, can be used to couple a molecular redox buffer to one of the components of the electrode with or without oxygen groups present. In embodiments with carbon-based interlayer with the presence of oxygen groups on the carbon, chemical attachment or coupling reactions can include, for example, esterification and amidation (with —COOH and epoxy groups), isocyanate functionalization (with —COOH and —OH groups) silanization (with —OH groups). In one embodiment, thiol groups can be used as the functional reactive groups for attachment to, for example, gold.

In one embodiment, the interlayer can be treated or modified to attach a reactive functional group as the linker. The molecular redox buffer can then be attached, e.g. covalently, to the interlayer with the reactive functional group serving as a linker disposed between the interlayer and the molecular redox buffer. The treatment or modification of the interlayer and the selection of the reactive functional group can be dependent on the composition of the interlayer and/or the molecular redox buffer.

In one embodiment, click chemistry can be used to attach a redox active molecule. See FIGS. 3A-3D. Click chemistry (copper(I)-catalyzed azide-alkyne cycloaddition) can be used, for example, where azide (—$N_3$) groups is first introduced to CIM carbon, followed by the subsequent click reaction with a cobalt tris(5-ethynyl-2,2'-bipyridine) complex.

Figure 3A:
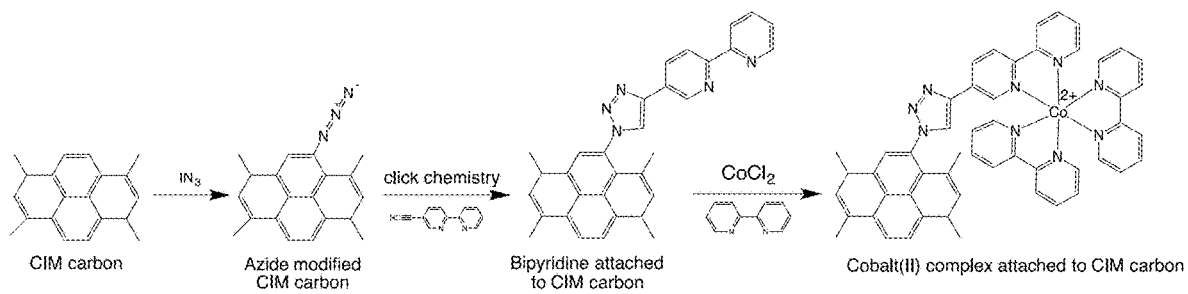
FIG. 3A is a schematic diagram of a route to prepare a cobalt-CIM carbon complex.
Figure 3B:
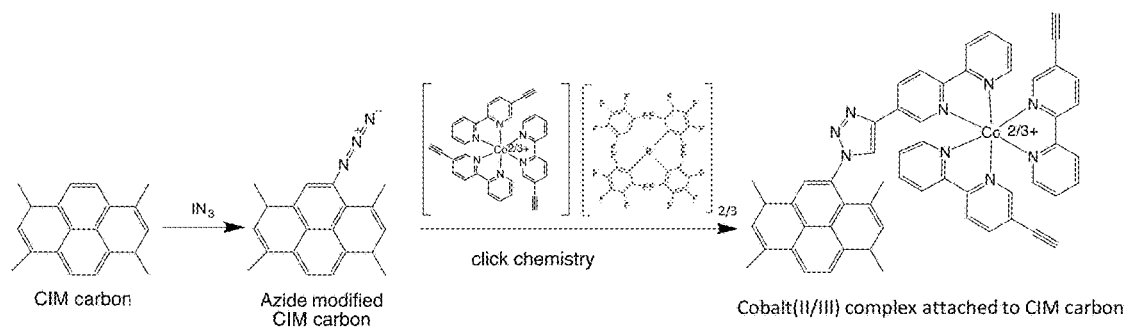
FIG. 3B is a schematic diagram of a route to prepare a cobalt-CIM carbon complex.
Figure 3C:
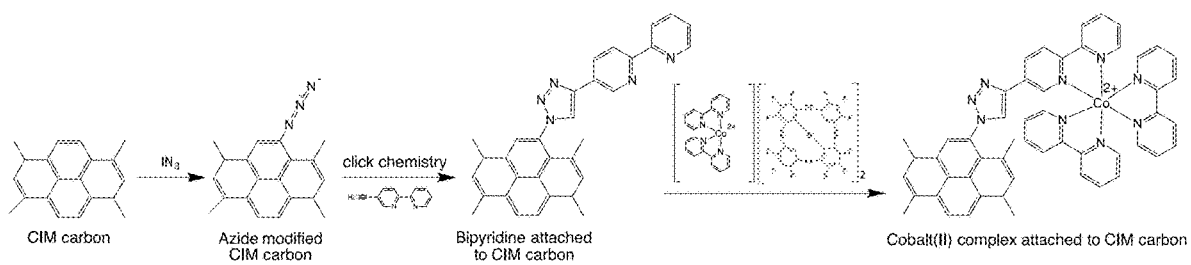
FIG. 3C is a schematic diagram of a route to prepare a cobalt-CIM carbon complex.

In another embodiment, amide coupling can be used to attach a redox active molecule. As shown in FIG. 3E, amide coupling, where —$NO_2$ groups are first attached to CIM carbon and are then reduced to —$NH_2$ groups. The amide coupling reaction can then be performed to attach the molecular redox buffer complex, e.g. a cobalt tris(bipyridine) complex, a cobalt bis(terpyridine) complex, or a cobalt porphyrin complex containing —COOH groups.

The treatment or modification of the interlayer, membrane or electron conductor and the selection of a reactive functional group can be dependent on the composition of the interlayer, membrane or electron conductor and/or the molecular redox buffer.

A variety of chemical reactions can be used to attach a redox active molecule, e.g. the cobalt complex, to CIM carbon. In one embodiment, a ligand can be attached to the interlayer with an attached functional group as shown in FIG. 3A. The redox active molecule with a redox species can then be synthesized onto the CIM carbon, for example, using click chemistry (FIG. 3A). In another embodiment, the redox active molecule can first be synthesized and then added to the CIM carbon with the reactive functional group (FIG. 3B).

Figure 3D:
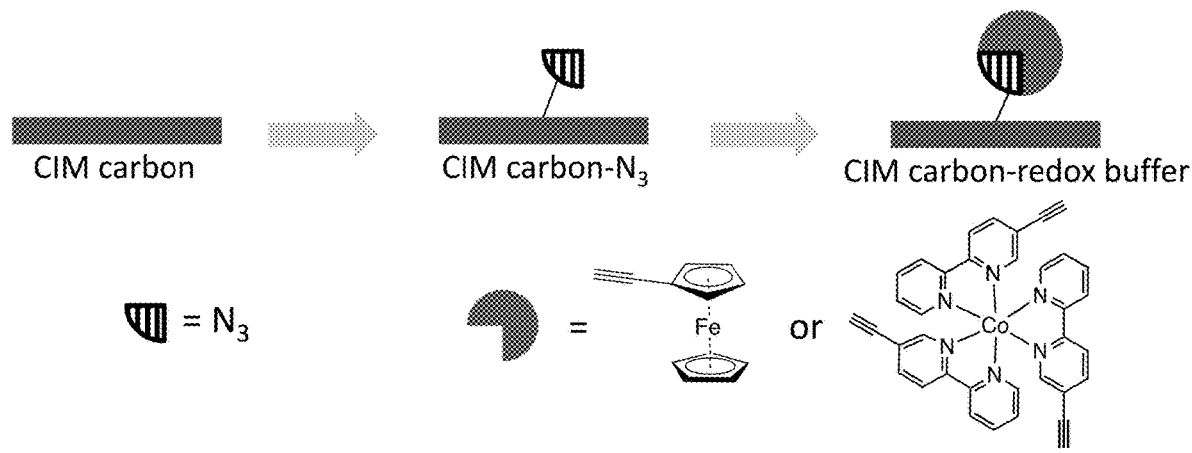
FIG. 3D is a schematic diagram of one embodiment of an approach to prepare CIM carbon-based redox buffer using click chemistry with azide as the functional reactive group.
Figure 3E:
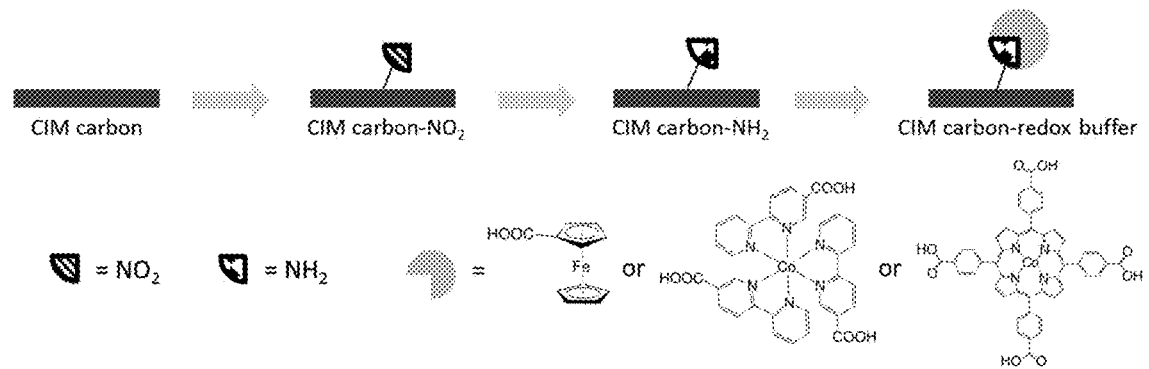
FIG. 3E is a schematic diagram of one embodiment of an approach to prepare CIM carbon-based redox buffer using amide coupling.

In one embodiment, a ferrocene derivative can be used as a model to demonstrate the feasibility of covalently attaching a redox-active molecule to CIM carbon using a specific chemical reaction as shown in FIGS. 3D and 3E.

In one embodiment, a CIM carbon-based redox buffer can be generated by covalently attaching Co(II) and Co(III) complexes (1:1 ratio) to the surface of CIM carbon. The ratio of the Co(II) to Co(III) can vary. In one embodiment, the ratio can be 1:1. Other ratios can also be used and are within the scope of this description. The resulting redox buffer can be used as a solid contact (ion-to-electron transducer) to interface with the sensing membrane to build all-solid-state potentiometric sensors. The sensing membrane may be biocompatible. The potentiometric sensor, for example, can include a reference electrode and ion complexing agent, e.g. $K^+$ ionophore, with high potential stability and E° reproducibility. The E° reproducibility can have, for example, a standard deviation of less than 0.7 mV for calibration-free ion sensing.

In one embodiment, azide (—$N_3$) can be used as the linker to provide the reactive functional group for the covalent attachment of the molecular redox buffer. The azide, for example, may be used to functionalize a CIM carbon interlayer as shown below. Formula (I) is used to represent the extended network of carbon atoms in CIM carbon but is not an exact representation of the complete structure of CIM carbon at the atomic level.

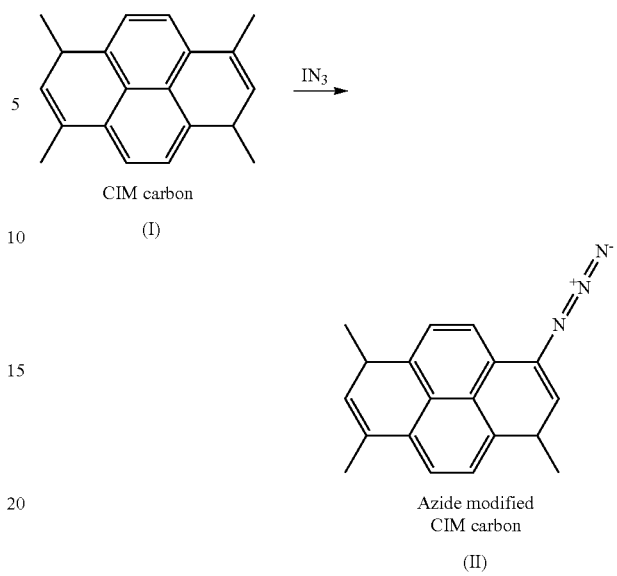

Although azide is shown as a linker to a CIM carbon interlayer, it is not limited to use with only CIM carbon. Azide may also be used to functionalize other interlayers and all are within the scope of this description.

The interlayer with the attached linker, e.g. formula (II), can be treated further to form a complex that can include the oxidized species and/or the reduced species of a redox couple. The oxidized species and the reduced species of the redox couple can be complexed within a molecule/ligand to form the molecular redox buffer. The molecular redox buffer can also be an organic molecule. The organic molecule may be a hydrophobic or a hydrophilic molecule.

A variety of molecules/ligands can be suitable for binding the reduced and/or oxidized species of the redox couple to form the redox buffer. In some embodiments, the molecular redox buffer may be synthesized first with the redox couple already bound within the molecule. The molecular redox buffer can then be attached to one of the components of the electrode, e.g. interlayer with an attached linker.

In some embodiments, the molecular redox buffer may be synthesized on the interlayer or other electrode components. In these embodiments, a monomeric reactant or ligand, for example, can be first coupled to one of the components of the electrode, e.g. to the linker attached to the interlayer. See FIG. 5A. Then the redox species and additional ligand can be added to the reaction. This results in the synthesis of the molecular redox buffer on the interlayer.

The reactants or ligands can include a variety of molecules. Reactants or ligands can include, for example, pyridines, bipyridines, terpyridines, phenanthrolines, porphyrin derivatives, acetylacetone derivatives, bipyridylimino isoindoline derivatives, crown ethers, cryptands, phthalocyanines, and other ligands known to those skilled in the art to bind $Co^{2+}/Co^{3+}$, $Os^{2+}/Os^{3+}$, $Fe^{2+}/Fe^{3+}$, $Cu^+/Cu^{2+}$, $Ni^{2+}/Ni^{3+}$, $Mn^{2+}/Mn^{3+}$, $Cr^{2+}/Cr^{3+}$, $Ru^{2+}/Ru^{3+}$, $Mo^{4+}/Mo^{5+}$, $Ag^+/Ag^{2+}$, $Ag^{2+}/Ag^{3+}$, $Sn^{2+}/Sn^{4+}$, $Ir^{2+}/Ir^{3+}$ and $Pb^{2+}/Pb^{4+}$ and the like. Bipyridines, can include, for example, structures (III), (IV), (V), (VI) shown below.

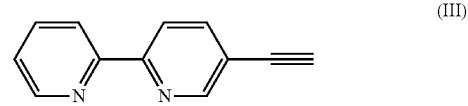

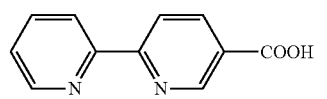

(IV)

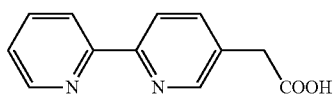

(V)

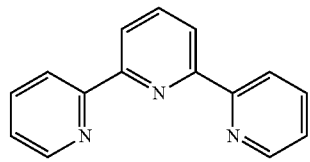

(VI)

Exemplary terpyridines (VII) and (VIII) ligands/reactants are shown below.

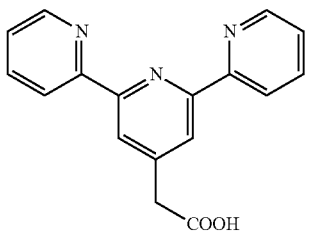

(VII)

(VIII)

Figure 19:
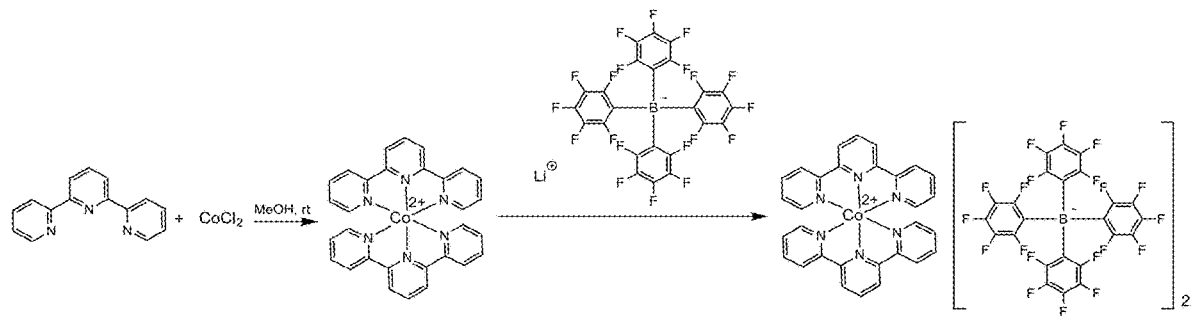
FIG. 19 is a diagram for the synthesis of cobalt(II) bis(terpyridine) complex.

In one embodiment, the use of terpyridine in the synthesis of molecular redox buffer is shown in FIG. 19.

In one embodiment, the reactants may react with the linker attached to the interlayer as shown in FIG. 3A. The interlayer with the attached linker can react with the ligand, e.g. 2,2-bipyridine, and a metal salt to form an interlayer with covalently attached redox buffer.

In one embodiment, the reduced species and the oxidized species are a Co(II) and Co(III) redox couple that can have, for example, the following structures (IX) and (X).

(IX)

Cobalt (II) complex (a cobalt tris(bipyridine)) attached to CIM carbon (X)

Cobalt (III) complex (a cobalt tris(bipyridine)) attached to CIM carbon

In one embodiment, click chemistry can be used to bind the redox buffer to the interlayer. The reduced species, e.g. Co(II), and the oxidized species, e.g. Co(III) can be attached to the carbon interlayer, e.g. CIM carbon interlayer. In an embodiment, a molecular redox buffer can be provided by the use of tetrakis(pentafluorophenyl)borate (TPFPB⁻) salts of cobalt(II) and cobalt(III) tris(5-ethynyl-2,2'-bipyridine).

In one embodiment, click chemistry can be used to bind one or more reactant molecules, e.g. 5-ethynyl-2,2'-bipyridine, to the CIM carbon surface with an attached azide group and $Co^{2+}$ and $Co^{3+}$ to form the (cobalt tris(bipyridine)) complex shown in formula (IX) or (X). A variety of methods for obtaining molecules with formula (IX) and (X) can be used and some exemplary methods are described in the Examples below.

Figure 5A:
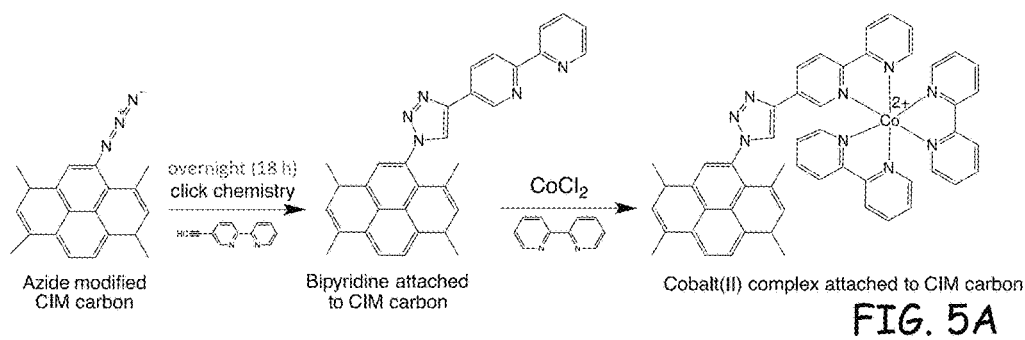
FIG. 5A is a schematic diagram of a route for the binding of the of 2,2'-bipyridine ligand to azide-CIM carbon via click chemistry to give a triazole linker, followed by cobalt complexation to form cobalt-CIM carbon complex.

In one embodiment, reactants, e.g., a 2,2'-bipyridine group, may be added to the interlayer with attached azide in a stepwise manner. In this embodiment, the molecular redox buffer is synthesized on the interlayer with the azide as the linker. This method is exemplified in the route as shown in FIG. 5A.

In one embodiment, the molecular redox buffer with either the reduced or oxidized species can first be fully formed as shown, for example, shown in FIG. 3B. The molecular redox buffer with the reduced or oxidized species may then be added to the interlayer with the reactive functional group.

Figure 11:
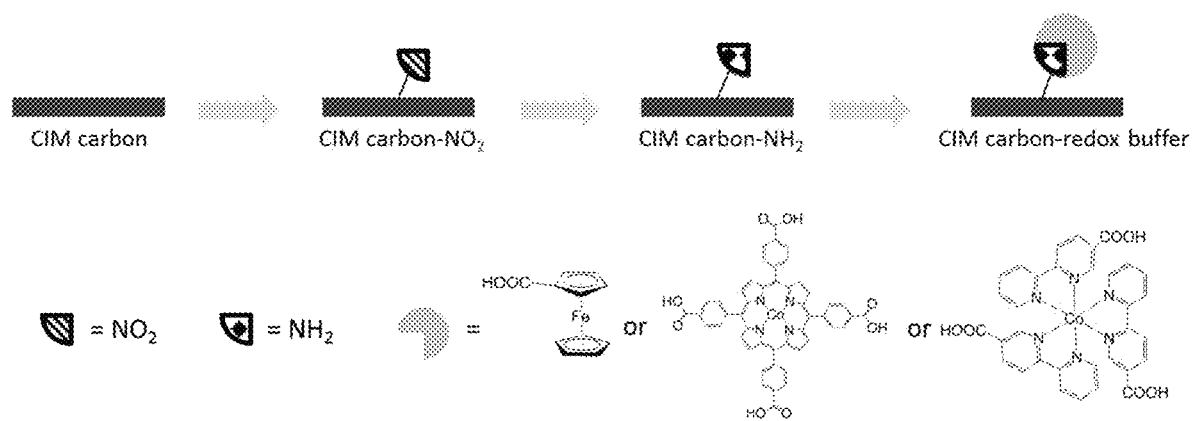
FIG. 11 is a schematic diagram of the attachment of a redox buffer via amide coupling.

In one embodiment, the molecular redox buffer can be attached to the interlayer through an amide linkage as shown schematically in FIG. 11 and described in detail in the Examples. A —$NO_2$ group can be attached to the interlayer. The —$NO_2$ is then reduced to $NH_2$. Coupling can then be conducted between the resulting interlayer with the —$NH_2$ (amide) linker and the redox active molecules. The redox active molecules can have —COOH groups, or activated forms of —COOH, such as carboxylic acid anhydrides, carboxylic acid fluorides, carboxylic acid chlorides, carboxylic acid bromides, or carboxylic acid iodides. The amide linkages can be used, for example, to couple structures, for example a ferrocene (XI), a cobalt porphyrin complex (XII) or cobalt tris(bipyridine) complex (XIII) shown below.

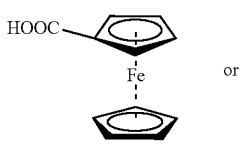

(XI)

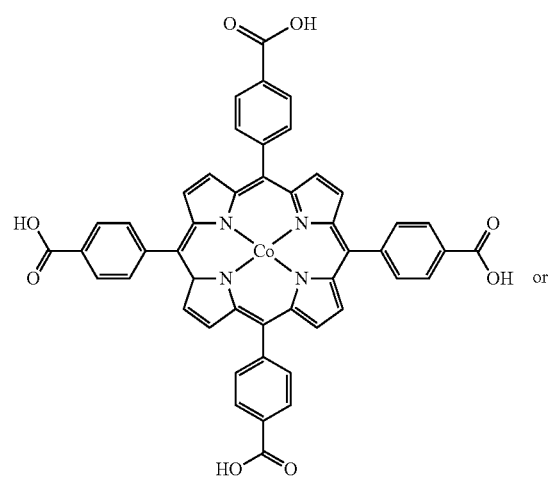

(XII)

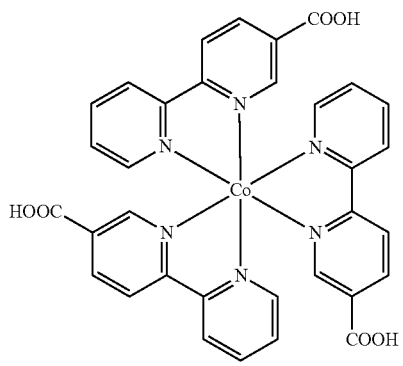

(XIII)

Other ferrocene complexes, bipyridine complexes and porphyrin complexes may also be used as molecular redox buffer complexes and all are within the scope of this description.

In one embodiment, a terpyridine complex, e.g. structure (XIV) below, may be synthesized first and then attached to CIM-$NH_2$ through amide coupling.

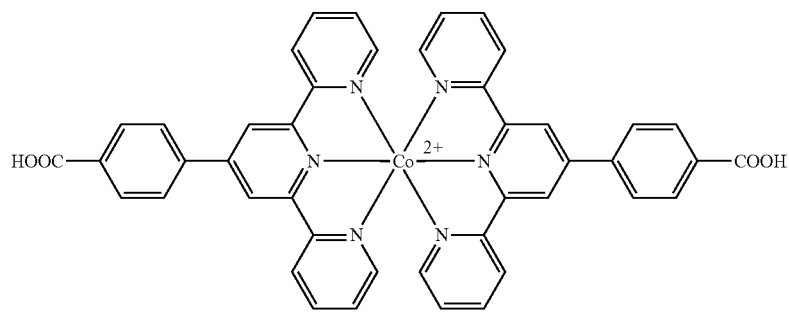

(XIV)

In one embodiment, the molecular redox buffer may be synthesized as the diazonium salt, e.g. structure (XV) below, and then attached to CIM carbon surface electrochemically in one step.

(XV)

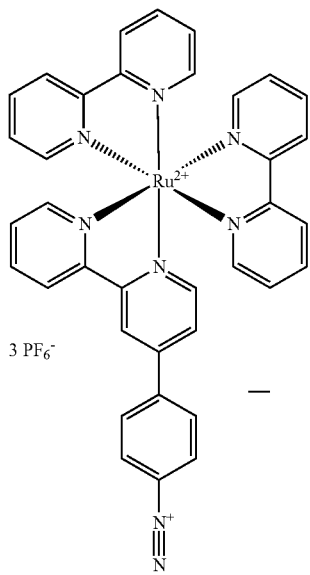

The ruthenium center of (XV) may be replaced with cobalt to vary the E° of the complex.

In one embodiment, an interlayer composition having both the oxidized and reduced species of a redox buffer complex can be formed by combining the products of two different reactions. The first product can be the interlayer material with the oxidized species and the second product can be the interlayer material with the reduced species. In one embodiment, the interlayer can be synthesized in a first reaction by covalent attachment of a molecule with the oxidized species of the redox buffer. In a second reaction, the interlayer can be synthesized by the covalent attachment of a molecule with the reduced species of the redox buffer. The interlayer materials from the two reactions can then be combined, in any desired ratio, to form an interlayer with the covalently attached redox buffer with a redox pair.

In one embodiment, an interlayer composition having both the oxidized and reduced species of a redox buffer can be formed by reducing a portion of the interlayer material with the oxidized species by the addition of a reducing agent. Alternatively, an interlayer composition having both the oxidized and reduced species of a redox buffer can be formed by oxidizing a portion of the interlayer material with the reduced species by the addition of an oxidizing agent. In one embodiment, both the oxidized species and the reduced species of the molecular redox buffer are attached simultaneously to the interlayer.

In one embodiment, the molecular redox buffer may be incorporated during the synthesis of the interlayer. The molecular redox buffer may be added by the addition of precursors during the interlayer synthesis. The precursors can include, for example, phthalocyanine, 1,10-phenanthroline (XVI) and the like. The 1,10-phenanthroline may be melted with mesophase pitch before carbonization.

(XVI)

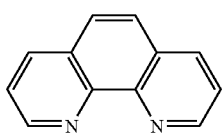

The molecular redox buffer may also be encapsulated in hollow porous carbon shells. The molecular redox buffer may be, for example, (XVII) and (XVIII) shown below.

(XVII)

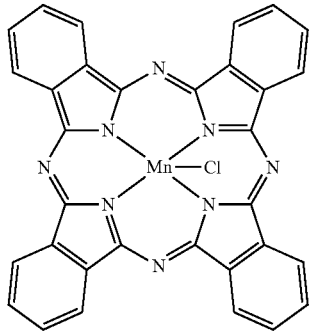

(XVIII)

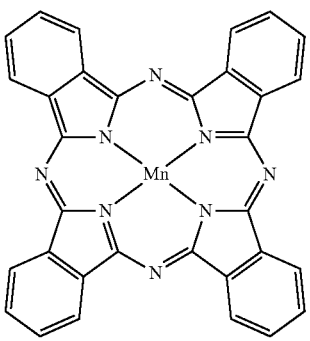

Figure 23A:
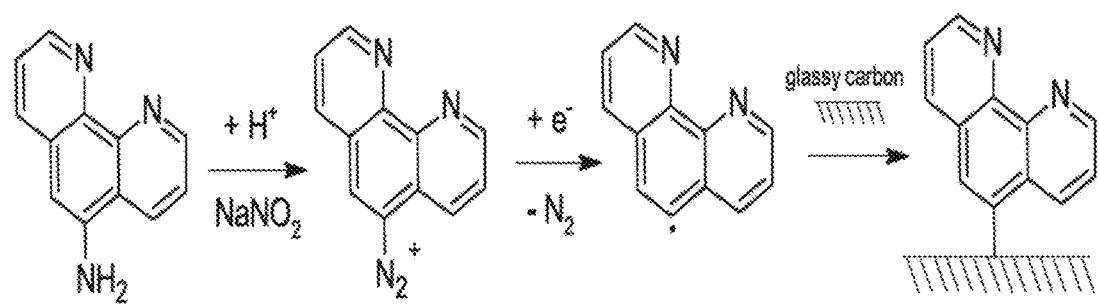
FIG. 23A is a schematic diagram for the electrochemical reduction of in-situ generated 5-diazo-1,10-phenanthroline cation and glassy carbon electrode modification.
Figure 23B:
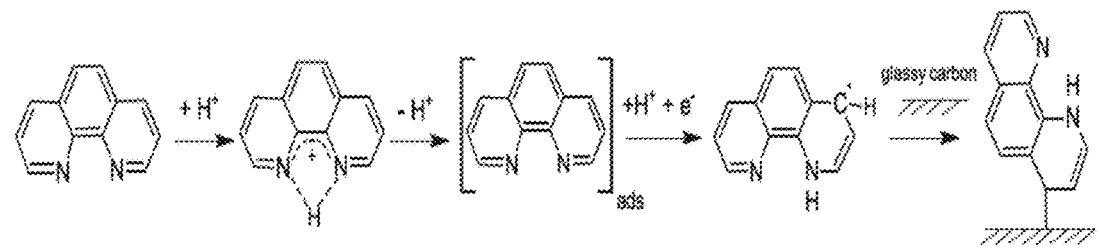
FIG. 23B is a simplified schematic diagram for the electrochemical reduction of 1,10-phenanthroline and glassy carbon electrode modification

In one embodiment, a phenanthroline ligand as shown in FIG. 23A and FIG. 23B can be attached to porous carbon, which may be used either as interlayer or as the electron conductor.

The ratio between the amount of oxidized complex and the amount of reduced complex in the electrode can be varied. The ratios between the amount of the complex with the oxidized species and the amount of the complex with the reduced species (oxidized species:reduced species) can be, for example, between about 10:1 and about 1:10. In some embodiments, the ratios are 10:1, 5:1, 1:1, 1:5, 1:10 and the like. Other ratios are also possible and all are within the scope of this description. The ratios of the oxidized and reduced species can be varied with redox reactions. The redox reactions may be chemical redox reactions or electrochemical redox reactions.

In one embodiment, an electron conductor may be functionalized by the addition of a linker, e.g. a thiol group to a gold electron conductor. The molecular redox buffer can then be covalently attached to the linker with the thiol group. In one embodiment, this covalent attachment may involve the formation of an amide bond. In one embodiment, this covalent attachment may involve a triazole group formed with a click reaction. In one embodiment, the species attached to the linker with the thiol group are reduced and oxidized complexes that are part of a redox couple synthesized prior to attachment to the linker. In one embodiment, the species attached to the linker with the thiol group is a ligand that is only subsequently reacted with metal salt and other ligand reactants to form the redox buffer species. The ligands described herein can also be used for the generation of the molecular redox buffer.

In one embodiment, the molecular redox buffer may be attached to a polymer that is part of the membrane. In one embodiment, the polymer is functionalized with azide groups. In one embodiment, the azide groups are reacted with oxidized or reduced redox buffer species with an acetylene group using the click reaction, forming a triazole linker. In one embodiment, the polymer is functionalized with amino groups. In one embodiment the amino groups are reacted with oxidized or reduced redox buffer species with a carboxylic acid group, a carboxylic acid chloride, a carboxylic acid bromide, a carboxylic acid iodide, or a carboxylic acid fluoride to form an amide bond. In one embodiment, the polymer is functionalized with a carboxylic acid group, a carboxylic acid chloride, a carboxylic acid bromide, a carboxylic acid iodide, or a carboxylic acid fluoride. In one embodiment, this polymer is reacted with oxidized or reduced redox buffer species with an amino group to give an amide bond.

The membrane polymer may be functionalized with a ligand and the redox molecular buffer may be synthesized, for example, by reacting the polymer with the attached ligand with tris(bipyridine) and a metal salt.

In one embodiment, the SC electrode may include two membranes. The molecular redox buffer may be attached to the polymer that is part of the inner membrane. The outer membrane may be placed over the inner membrane such that the molecular redox buffer is not directly exposed to the measured sample.

Benefiting from the high capacitance of the interface between the CIM carbon and the reference or ISE membrane, outstanding potential stability can be observed. The SC-reference and ISE electrodes can be compatible with miniaturized potentiometric systems and can also be integrated into disposable paper-based sensing devices, e.g. Cl sensing devices. These electrodes can also be advantageously printed, e.g. stencil printed, ink jet printed, 3D-printed and the like. The conventional Ag/AgCl reference electrodes can be replaced, eliminating the reference electrolyte and the associated liquid junction potentials. The SC-reference electrodes and ISE electrodes with the interlayer including the covalently attached molecular redox buffer generally has a low potential variability.

For aqueous samples that contain electrolytes with different charges and hydrophilicities, there is only a very small emf response of the SC reference electrode in the $10^{-7}$ M to $10^{-1}$ M concentration range. In some embodiments, the response is even wider range of $10^{-14}$ M to $10^{-1}$ M. The change in emf can be less than about 3.0 mV/decade. In some embodiments, the change in emf may be less than about 2.0 mV/decade or even less than about 1.0 mV/decade.

The standard deviation of measured E° in SC-reference electrodes can be less than about 5 mV. In some embodiments, the standard deviation of measured E° can be less than about 3 mV or in some embodiments, less than about 1 mV. The potential drift of the SC-reference electrode is generally low. In some embodiments, the potential drift of the SC-reference electrode in a continuous measurement can be less than about 3 µV/h and in some embodiments less than about 2 µV/h.

The present description also includes electrochemical sensor systems. The electrochemical sensor systems can include at least one solid contact electrode with chemically attached molecular redox buffer to one of the electrode components. In one embodiment, SC—ISEs and/or the reference electrode in the electrochemical sensor systems have the molecular redox buffer covalently attached to the interlayer. The electrochemical system can include a workstation and 2, 3, 4 or more electrodes. In one embodiment, at least one of the electrodes can be an SC-ISE. The SC-ISEs of the system may not require calibration. The electrochemical sensor system components may also include a work station, power source, current meter, sample holder, computer or handheld/mobile computing device and/or recorder with optionally a display. The recording device and/or computer/computing device can record and/or compute the amount or concentration of an analyte in a sample. The components of the electrochemical sensor systems may be integral within the system, i.e., housed together, or they may be separate components that can be electrically connected to form the electrochemical sensor systems.

The electrochemical sensor system may be configured to be, for example, a potentiometric sensor, an ion-sensitive field effect transistor, a voltammetric sensor, an amperometric sensor, a coulometric sensor or an impedance sensor. A general electrochemical measurement system can include, for example, an electrochemical workstation that can be connected to a plurality of electrodes. The electrochemical workstation may be connected to two, three, or four electrodes. In a system with multiple ion-selective electrodes, the electrochemical workstation may be connected to a total of more than four electrodes. All of the electrodes can be in contact with the sample. In one exemplary embodiment with a potentiometric system, a reference and sensing electrode are connected to the workstation, which is referred to as a potentiometer or voltmeter or potentiostat. In an embodiment with a voltammetric system, a reference, an auxiliary, and a sensing electrode are connected to the workstation. Impedance and ion transfer voltammetry measurements can be performed with two, three or four electrodes. Other components known in the art may also be present and may also be part of the electrochemical system and all are within the scope of the present description. The electrochemical sensor systems can detect a variety of analytes including, for example, $H^+$, $Li^+$, $Na^+$, $K^+$, $Mg^{2+}$, $Ca^{2+}$, $Cu^{2+}$, $Ag^+$, $Zn^{2+}$, $Cd^{2+}$, $Hg^{2+}$, $Pb^{2+}$, $NH_4^+$, carbonate, bicarbonate, nitrate, nitrite, sulfide, phosphate, chloride, iodide, perfluoroalkylsulfonates, perfluoroalkanoates and the like, as well as organic anions and cations such as heparin, protamine, and the like.

The present description includes paper-based sensing devices. The paper-based devices can be disposable and may be potentiometric sensing devices. A variety of ions or analytes in samples can be detected in the paper-based devices as described ion-selective electrodes described herein. The paper-based device can include a SC reference electrode and an ISE as described herein with the covalently attached molecular redox buffer. The ISE can be stencil-printed. The ISE can be printed using other printing methods such as ink jet printing or 3D printing, and all are within the scope of this description.

These calibration-free electrodes can be used in the fabrication of calibration-free sensors for point of care analysis. A particularly attractive application is the fabrication of calibration-free sensors for the point of care analysis. This could open an application window for use in real time monitoring of electrolyte balance in athletes. The calibration-free electrodes can be wearable sensors, implantable diagnostic medical devices and the like.

In an exemplary embodiment, a paper-based potentiometric sensing device is a Cl sensing device. The miniaturized potentiometric Cl sensing devices can be fabricated on paper. The paper-based sensing device includes a stencil-printed Ag/AgCl electrode serving as the ISE and a SC reference electrode that includes the CIM carbon with the covalently attached redox buffer. The paper-based system may also include a SC reference electrode and a SC-ISE with the covalently attached redox buffer.

Sample size to be analyzed in the paper-device device can vary. The size of the sample can vary, for example, between about 1 µL and about 200 µL. Sample sizes can be, for example, between about 5 µL and about 100 µL. In one exemplary embodiment, sample sizes as small as about 10 µL can be analyzed.

The present description includes a method for forming the interlayer, membrane or the electron conductor with the covalently attached redox buffer in the fabrication of the SC-electrodes described herein. The electrodes can be a SC-ISE electrode or a SC-reference electrode. In one embodiment, the method can include using CIM carbon synthesized from synthetic material such as aromatic hydrocarbons. The synthetic material can be, for example, mesophase pitch. Methods for synthesizing CIM carbon are known in the art and can be, for example, the method described in U.S. Pat. No. 7,666,380 to Jaroniec and incorporated herein by reference. The synthetic material could also be any other type of aromatic hydrocarbon that does not evaporate above roughly 500° C. but softens above roughly 200° C. so as to allow the template to penetrate the synthetic material. Mesophase pitch can be ground and dispersed in a solution, for example, as described below in Example 1. The mesophase pitch powder can be treated with colloidal materials such as colloidal silica. Other colloidal materials may also be used and these colloidal materials are generally small spherical particles with diameters that correspond to the desired size of the mesopores in the CIM carbon.

In one embodiment, the method includes using CIM carbon as the interlayer between the solid electron conductor and the membrane with the CIM carbon interlayer having covalently attached molecular redox buffer.

The membrane can be an ISM or a reference membrane. The method includes forming a thin film with the CIM carbon interlayer with the covalently attached redox buffer over the solid electron conductor. In one embodiment, a CIM carbon powder may be formed into a suspension and drop cast over the solid electron conductor such as a gold disk to form thin films. In one embodiment, a CIM carbon powder can be ground with Teflon binder and then can be processed through a roller press to form a carbon film. The thickness of the film can vary and can be, for example, between about 0.5 µm and about 1000 µm. In some embodiments, the thickness of the film can be between about 50 µm and about 250 µm.

The method can also include forming or placing a membrane over the interlayer. In an exemplary embodiment, an ISM is placed over the interlayer. In some embodiments, an ionophore-doped membrane is formed or placed over the interlayer. An exemplary ISM is a valinomycin-doped $K^+$ membrane. Other ionophore-doped membranes as described above are also within the scope of this description. The ISM can be of varying thickness and can be, for example, between about 10 µm and 500 µm. In some embodiments, the membrane thickness is about 100 µm. To prevent delamination of the interlayer and the ISM, the electrode may be mounted into a cylindrical body and/or other appropriate housing to gently press the ISM and interlayer onto the conductor of the electrode.

In one embodiment, a reference membrane is placed over the CIM-carbon interlayer. In some embodiments, the reference membrane formed over the interlayer is doped with a moderately hydrophilic ionic liquid. A variety of hydrophilic ionic liquids can be used. In one exemplary embodiment, the ionic hydrophilic liquid 1-methyl-3-octylimidazolium bis(trifluoromethylsulfonyl)imide is used. Other membranes as described above are also within the scope of this description. The reference membrane can be of varying thickness and can be, for example, between about 20 µm and 500 µm. In some embodiments, the reference membrane thickness is about 100 µm. To prevent delamination of the interlayer and the reference membrane, the electrode may be mounted into a cylindrical body and/or other appropriate housing to gently press the reference membrane and interlayer onto the conductor of the electrode.

The present description can also include a method for measuring analytes in a sample. The analytes are generally ions in a sample. The ions may be in natural substances or synthetic substances. The samples can be clinical samples, environmental samples, industrial samples, forensic samples, residential samples, agricultural samples, bodily fluid samples and the like. Bodily fluid samples can include blood, urine, sweat, saliva and the like and can be measured, for example, in wearable applications and on-body monitoring. The bodily fluid samples may be collected and analyzed. Alternatively, the bodily fluids may be still present on or in the organism and measured, for example, by a wearable sensor. Clinical samples can include samples generated in hospitals, clinics, in point-of-care scenarios such as home or other settings. Clinical samples can be from healthy individuals or individuals with medical issues. The samples may be liquid or gas samples. If the sample is a gas, the electrochemical sensor may be or may not be separated from the sample by a gas-permeable membrane.

The method includes contacting a sample with a system so that it will contact the ISE. The method can also include placing the sample in the system or the system upon the sample, e.g. a wearable sensor system. The system may include one or more SC electrodes. In some embodiments, the system includes a SC-ISE and/or a SC-reference electrode with a covalently attached molecular redox buffer to one of the components of the electrode. The electrode(s) with the covalently attached molecular redox buffer can be used in an electrochemical sensor to determine the concentration or amount of the analyte in the sample. The amount and/or concentration of the analyte in the sample can be measured using a variety of techniques and characteristics. The samples may be analyzed using potentiometric, voltammetric, amperometric, coulometric or impedance methods known in the art. Other methods compatible with electrochemical sensors may also be used and are within the scope of this description. The amount of analyte(s) in a sample that can be measured include, for example, $H^+$, $Li^+$, $Na^+$, $K^+$, $Mg^{2+}$, $Ca^{2+}$, $Cu^{2+}$, $Ag^+$, $Zn^{2+}$, $Cd^{2+}$, $Hg^{2+}$, $Pb^{2+}$, $NH_4^+$, carbonate, bicarbonate, nitrate, nitrite, sulfide, phosphate, chloride, iodide, perfluoroalkylsulfonates, perfluoroalkanoates and the like, as well as organic anions and cations such as heparin, protamine, and the like. The results may then be correlated with known concentrations of the analytes to determine the quantity or concentration of the analyte in the sample. The samples may be analyzed using potentiometric, voltammetric, amperometric, coulometric or impedance methods known in the art. Other methods compatible with electrochemical sensors may also be used and are within the scope of this description. The results may then be correlated with known concentrations of the analytes to determine the quantity or concentration of the analyte in the sample.

The present description also relates to a method of measuring an analyte in a paper-based sensing device. The paper-based device can be a disposable, potentiometric sensing device. The method includes contacting or applying a sample to the area around the ISE. The size of the sample can vary. In some embodiments, the sample can be, for example, between about 5 μL and about 200 μL. The sample can be placed so that it can come into contact with the ISE. The ISE can be, for example, stencil-printed onto the paper-based device. The paper-based device can include a SC reference electrode with the covalently attached molecular redox buffer as described herein. The method includes measuring the electrode potentials with a potentiometer and correlating the results of the potentiometer readings to determine the analyte quantity or concentration in a sample. The potentiometer readings, for example, may be correlated to readings obtained from known concentration of analytes in standard samples to determine the analyte concentration in a sample.

EXAMPLES

Example 1-CIM Carbon Synthesis

Materials. Reagents were obtained from the following sources: mesophase pitch from Mitsubishi Gas Chemicals (Tokyo, Japan), Ludox AS-40 colloidal silica, sodium ethoxide solution (21 wt % in ethanol), bromocresol green/methyl red (mixed indicator solution in methanol), tetraethylammonium tetrafluoroborate (TEABF$_4$), sodium azide, cobalt(II) chloride hexahydrate, iodine chloride, N,N-diisopropylethylamine, and valinomycin from Sigma-Aldrich (St. Louis, Mo.), o-nitrophenyl octyl ether (o-NPOE), and high molecular weight poly(vinyl chloride) (PVC) from Fluka (Buchs, Switzerland), sodium tetrakis[3,5-bis-(trifluoromethyl)phenyl]borate (NaTFPB) from Dojindo (Kumamoto, Japan), and lithium tetrakis(pentafluorophenyl)borate (LiTPFPB) ethyl etherate from Boulder Scientific (Boulder, Colo.), and 5-ethynyl-2,2'-bipyridine from Ark Pharm (Libertyville, Ill.), and tris-(benzyltriazolylmethyl)amine from TCI America (Portland, Oreg.). All chemicals were used as received without further purification. Deionized water was purified to a resistivity of 18.2 MΩ/cm with a Milli-Q PLUS reagent-grade water system (Millipore, Bedford, Mass.).

CIM Carbon Synthesis. The CIM carbon was synthesized using a modification of a previously reported route (Li et al. *J. Am. Chem. Soc.* 2001, 123, 9208-9209). A mass of 5 g of mesophase pitch was manually ground and dispersed in 100 mL of an ethanol/water mixture (~60:40 volume ratio) at 50° C. Under vigorous stirring, 100 mL of Ludox AS-40 colloidal silica suspension was added gradually into the flask, and the resulting mixture was stirred overnight at 50° C. The resulting mixture was transferred to an open plastic beaker, stirred, and kept at 50° C. overnight to allow solvent evaporation. The obtained pitch-silica composites were then transferred into a porcelain combustion boat and heated under a N$_2$ flow (0.5 L/min) with a heating ramp of 5° C./min to 400° C., at which temperature it was kept for 2 h. The subsequent carbonization at 900° C. for 2 h in a N$_2$ atmosphere converted the pitch-silica composites to carbon-silica composites. To remove the silica spheres, the carbon-silica composites were then soaked in 6 M KOH aqueous solution and kept for 48 h at 180° C. in a Teflon-lined steel autoclave. The obtained CIM carbon was filtered and washed with copious amounts of water until the pH was 7. Before use, the CIM carbon was pyrolyzed under a 5% H$_2$, 95% N$_2$ flow (0.6 L/min) at 900° C. for 5 h to reduce absorbed moisture and functional groups on the carbon surface.

Example 2-Synthesis of CIM Carbon with Covalently Attached Redox Buffer

This example describes a Co(II)/Co(III) redox buffer based on colloid-imprinted mesoporous (CIM) carbon. Co(II) and Co(III) complex were covalently attached to CIM carbon to form Co(II)—CIM carbon and Co(III)—CIM carbon as shown in FIG. 2A and FIG. 2B. When used as a redox buffer, the two kinds of the CIM carbon can be mixed, and the open-circuit potential of the mixture can be controlled by the ratio of the Co(III)-CIM carbon and Co(II)—CIM carbon. as shown in the equation below.

$$E = E^o + \frac{RT}{nF} \ln \frac{C_{ox}}{C_{red}} \qquad \text{Equation (A)}$$

This CIM carbon-based redox buffer can be used as ion-to-electron transducer in all-solid-state ion sensors to obtain calibration-free sensors.

Different routes were used to prepare Co(II)-CIM carbon and Co(III)—CIM carbon.

Route as shown in FIG. 3A: CIM carbon was treated with IN$_3$ to attach N$_3$ groups onto the carbon surface, then click chemistry was performed to bind 2,2'-bipyridine to CIM carbon surface. CoCl$_2$.6H$_2$O and free 2,2'-bipyridine were used to form the complex on CIM carbon surface.

Route as shown in FIG. 3B: A pre-formed Co complex containing three equivalents of 2,2'-bipyridine with triple bonds were synthesized. This complex was used to bind the N$_3$ attached to CIM carbon via click chemistry. This Route was used to prepare Co(II)-CIM carbon.

Route (prophetic) as shown in FIG. 3C: A pre-formed Co complex containing two equivalents of 2,2'-bipyridine can be synthesized, and then reacted with bipyridine attached CIM carbon to form the complex on CIM carbon surface.

Figure 4A:
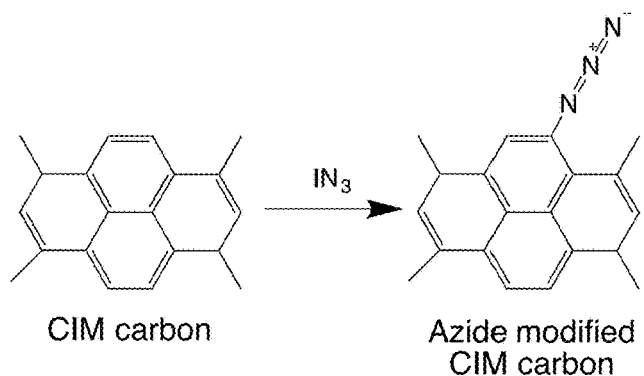
FIG. 4A is a pathway for the formation of azide modified CIM carbon.
Figure 4B:
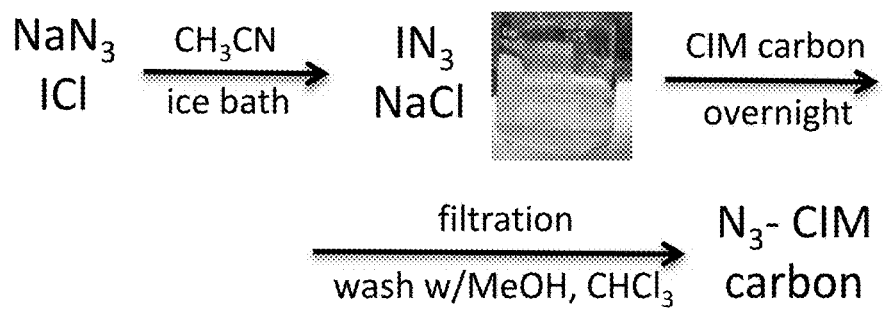
FIG. 4B is a schematic diagram of a process for the formation of the azide modified CIM carbon.
Figure 4C:
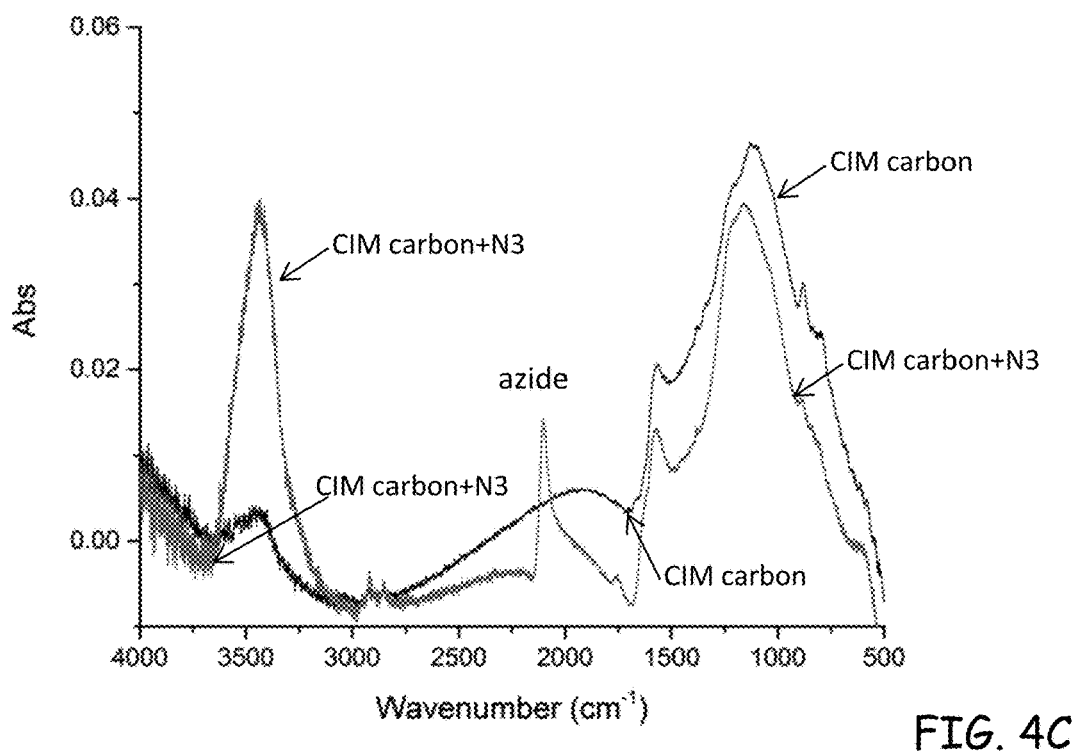
FIG. 4C is a graph of the infrared (IR) spectra of the CIM carbon before and after the azide treatment by a chemical method ($IN_3$).

For all of the routes in FIGS. 3A-3C, the first step is to attach N$_3$ groups onto the CIM carbon surface as shown in FIG. 4A. This was done by following the procedures reported in Devadoss et al. *J. Am. Chem. Soc.* 2007, 129, 5370-5371, in which azide-modified graphitic surfaces had been used. For a typical synthesis, 30 mg of CIM carbon was immersed in 10 mL of a CH$_3$CN solution containing 20 mg of NaN$_3$ and 5 μL of ICl, followed by extensive washing with methanol and chloroform as shown in FIG. 4B. As shown in the IR spectra shown in FIG. 4C, after azide treatment, CIM carbon exhibited a peak around 2100 cm$^{-1}$, which can be attributed to the successful attachment of N$_3$ groups on the CIM carbon surface.

Figure 5B:
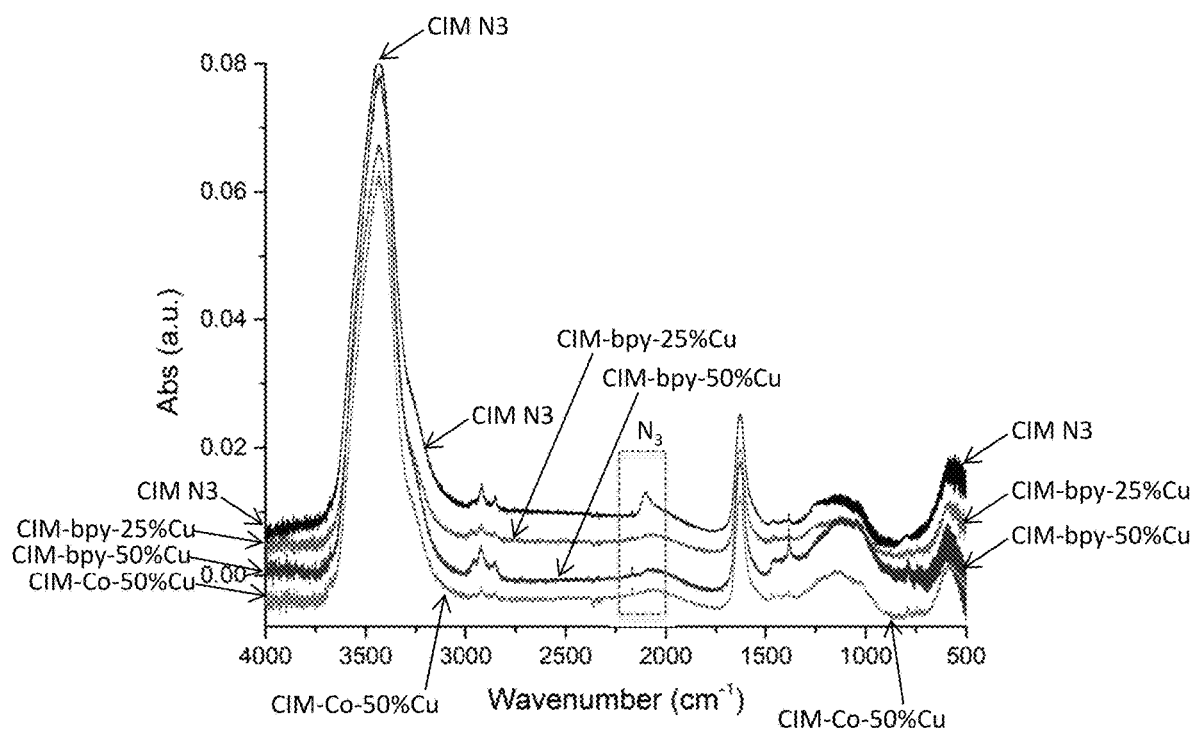
FIG. 5B is a graph of the IR spectra of the modified CIM carbon materials before and after the click chemistry.

For Route in FIG. 3A, the next step was to bind a 2,2'-bipyridine ligand to N$_3$-CIM carbon via click chemistry as shown in FIG. 3A and FIG. 5A. The reaction was done based on a previously reported method in Landis et al. *Chem. Mater.* 2009, 21, 724-730, in which redox-active molecules had been attached to carbon nanofibers. 35 mg of N$_3$-CIM carbon was immersed in 10 mL of a (3:1 v/v) DMSO/water solution containing 7.3 mg of 5-ethynyl-2,2'-bipyridine, various amounts of Cu(II)(tris-(benzyltriazolylmethyl)amine)Cl$_2$ and 76 mg of sodium ascorbate overnight. The obtained product was labeled as CIM-bpy in FIG. 5B. 25% Cu and 50% Cu refers to the added mol % of Cu(II)(tris-(benzyltriazolylmethyl)amine)Cl$_2$ in respect to 5-ethynyl-2,2'-bipyridine in the reaction. As the IR spectra show in FIG. 5B, the azide peak intensity significantly decreased after click chemistry.

Figure 5C:
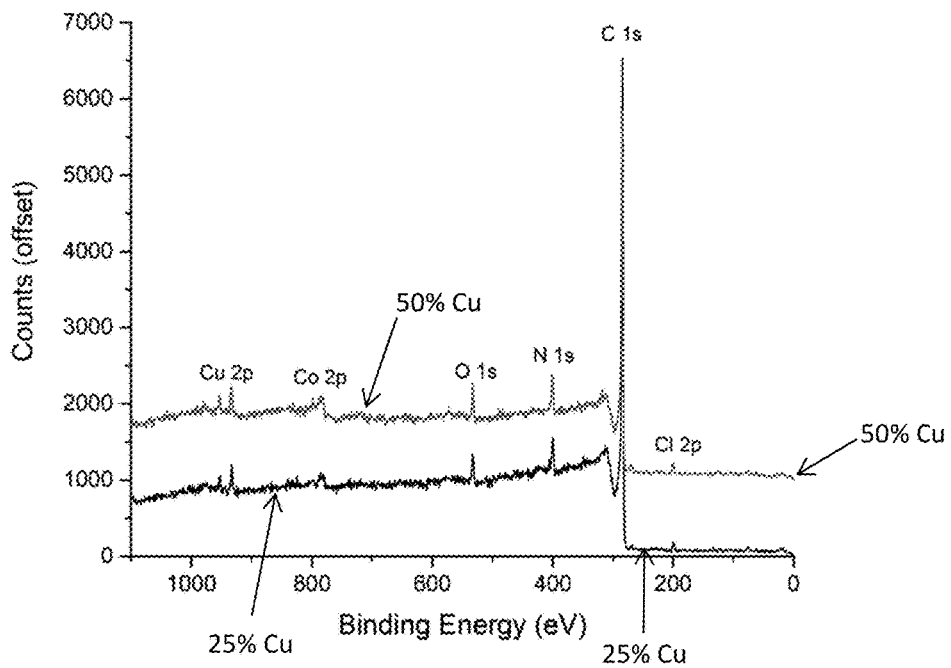
FIG. 5C is a graph of the X-ray photoelectron spectroscopy (XPS) spectra of the CIM carbon-Co(II).

The next step was to form the complex on CIM carbon. 15 mg of CoCl$_2$.6H$_2$O and 10 mg of 2,2'-bipyridine was dissolved in 3 mL of methanol, in which CIM-bpy was immersed at 70° C. for 3 hours. The obtained product was extensively washed with methanol and labeled as CIM-Co (II). The presence of Co can be demonstrated by X-ray photoelectron spectroscopy (XPS) as shown in FIG. 5C. As shown in Table 2 below, CIM-Co(II)-25% Cu has 0.67% of Co, and CIM-Co(II)-50% Cu has 0.95% of Co.

TABLE 2

|  | C (%) | N (%) | O (%) | Co (%) | Cl (%) | Cu (%) |
|---|---|---|---|---|---|---|
| CIM-Co(II)-25% Cu | 91.31 | 4.46 | 2.28 | 0.67 | 0.60 | 0.65 |
| CIM-Co(II)-50% Cu | 88.43 | 5.93 | 2.96 | 0.95 | 1.00 | 0.70 |

Figure 6:
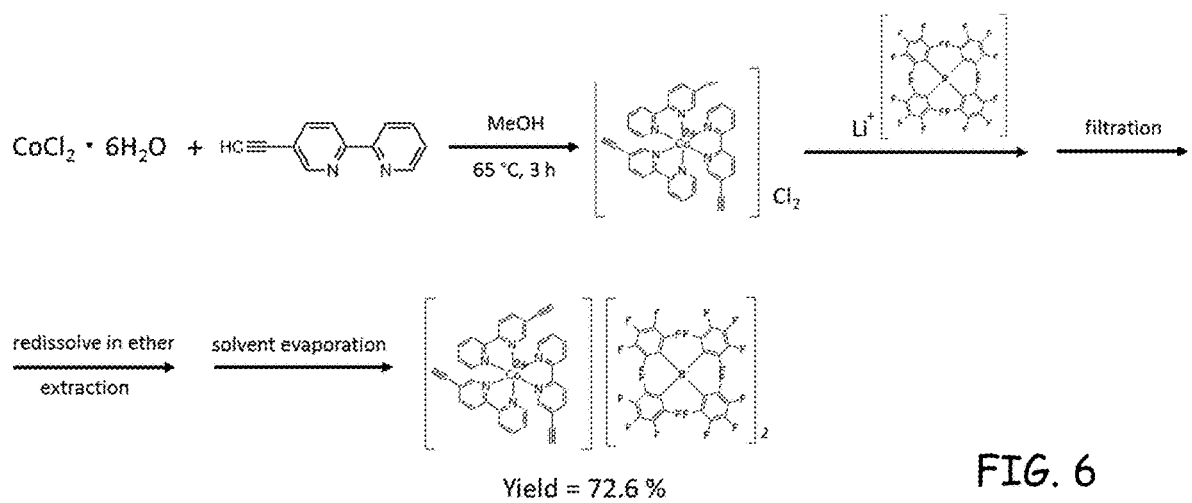
FIG. 6 is a schematic diagram of the formation of the Co(II) complex used for the route shown in FIG. 3B.

Route in FIG. 3B: A pre-formed Co complex containing three equivalents of 2,2'-bipyridine with triple bonds was synthesized as shown in FIG. 3B and FIG. 6. This complex was then bound to $N_3$ attached CIM carbon via click chemistry.

To synthesize the Co complex cobalt(II)tri(5-ethynyl-2,2'-bipyridine), 238 mg of $CoCl_2 \cdot 6H_2O$ was mixed with 3 equivalents of 5-ethynyl-2,2'-bipyridine in 3 mL of methanol at 65° C. for 3 hours as shown in FIG. 6. Then 2 equivalents of lithium tetrakis(pentafluorophenyl)borate ethyl etherate were added to the solution to form a precipitation. After purification and solvent evaporation, the Co complex was obtained with a yield of 72.6%.

The next step was to perform click chemistry between $N_3$-CIM carbon and the complex. The reaction conditions were based on Yao et al. J. Am. Chem. Soc. 2012, 134, 15632, in which surface groups were covalently linked to diamond decorated with alkyl azides. In an analogous way 20 mg of $N_3$-CIM carbon was immersed in a THF/EtOAc (2:1 v/v) solution saturated with sodium ascorbate together with 38 mg of Co complex, 1 mg of $Cu(BF_4)_2$ and 0.19 g of N,N-diisopropylethylamine (DIPEA).

Figure 7A:
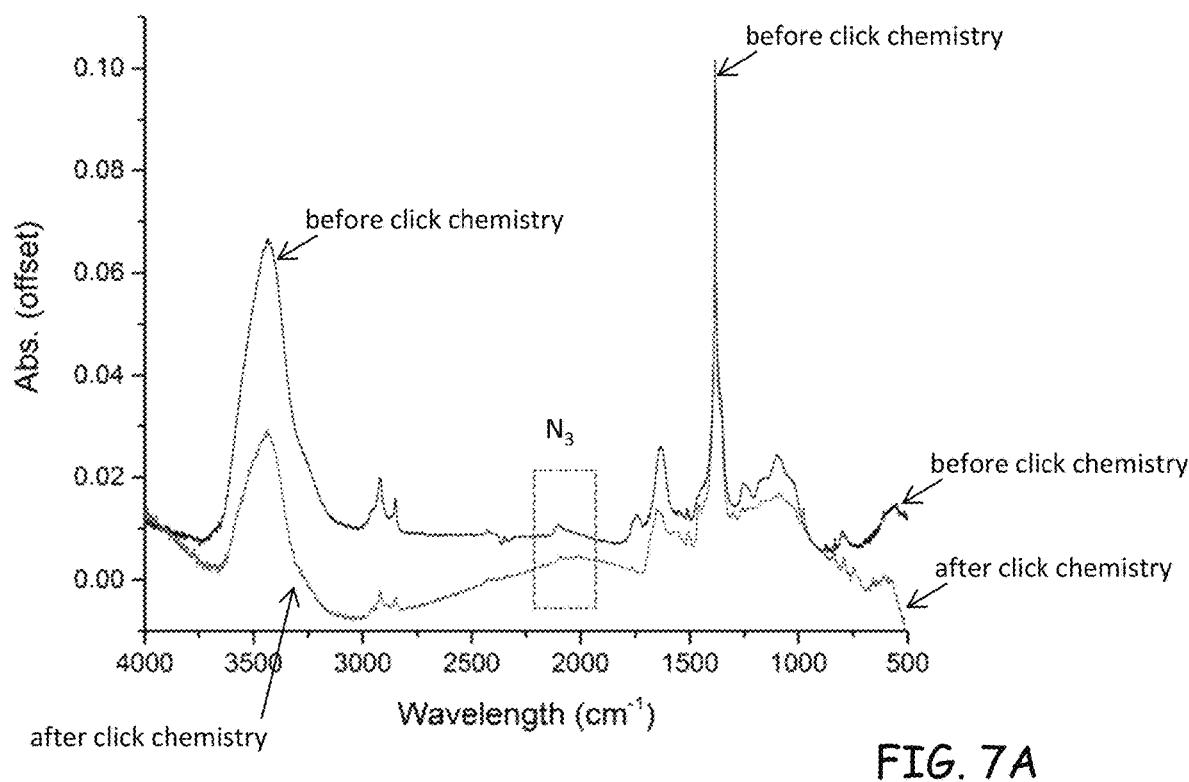
FIG. 7A is a graph of the IR spectral results obtained from CIM-Co(II) by route shown in FIG. 3B.
Figure 7B:
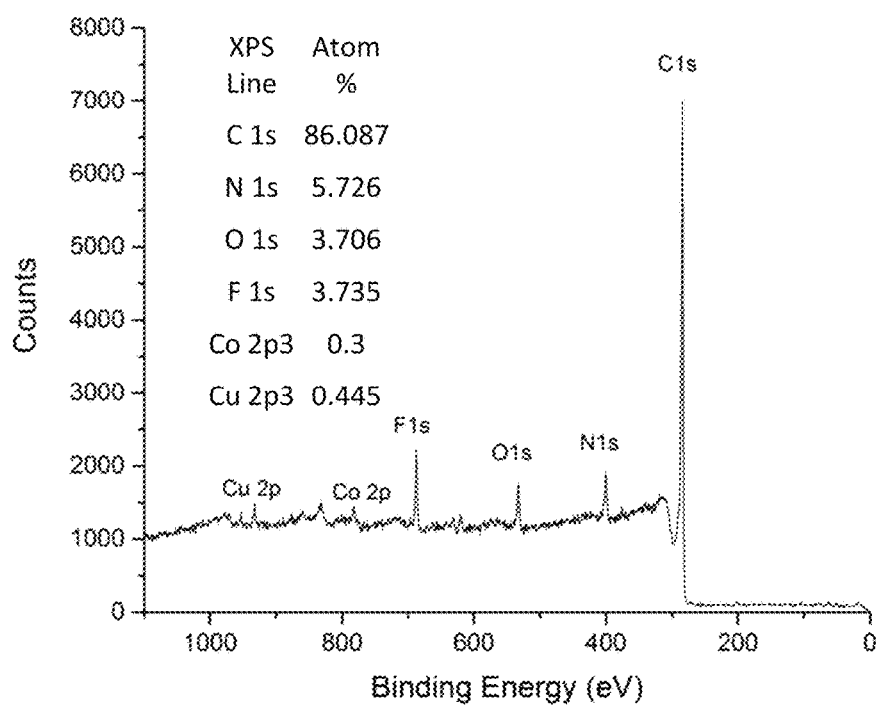
FIG. 7B is a graph of the XPS spectral results obtained from CIM-Co(II) by route shown in FIG. 3B.

FIGS. 7A and 7B show IR spectra and XPS spectra, respectively. These results were obtained from the CIM-Co(II) prepared according to the route depicted by FIG. 3B. From the IR spectra in FIG. 7A, it can be seen that the peak intensity of the peak around 2100 $cm^{-1}$ corresponding to $N_3$ decreases after click chemistry. From the XPS result shown in FIG. 7B, 0.3% of Co was observed.

Example 3-Preparation of CIM-Co(III) and the Redox Buffer Containing CIM-Co(II) and CIM-Co(III)

CIM-Co(II) was prepared according to route in FIG. 3A as described above. CIM-Co(III) was prepared by oxidizing CIM-Co(II) using a methanol solution containing excess of $Br_2$.

A CIM carbon-based redox buffer was prepared by mixing CIM-Co(II) and CIM-Co(III) at different ratios, and the redox buffer was made into a film using the method described before. Then the open circuit potential (OCP) was measured in an electrolyte containing 100 mM tetraethylammonium tetrafluoroborate in propylene carbonate. Ideally, the OCP should be controlled by the ratio of CIM-Co(II) and CIM-Co(III) as shown in the equation (A) above, with a Nernstian slope of −58 mV per decade at 20° C.

A buffer with a ratio of CIM-Co(II): CIM-Co(III)=5:1 was made. The stabilized OCP was −176±4 mV (n=3)

A redox buffer containing CIM-Co(II): CIM-Co(III)=1:1 was made. The OCP was −179±12 mV (n=3)

A redox buffer containing CIM-Co(II): CIM-Co(III)=1:5 was made. The OCP was −97±3 mV (n=3)

Example 4-Preparation of CIM Carbon-Based Redox Buffer with Click Chemistry

Diazonium salt 4-azidobenzene diazonium tetrafluoroborate was synthesized following a previously reported procedure (Chem. Eur. J. 2008, 14, 9286). CIM carbon powder was combined with 5 wt % Teflon binder and pressed under a roller press to form a film of ~100-200 μm thickness. The film was then cut into individual electrodes using a 7/32 inch punch. An electrolyte was prepared in an ice bath by dissolving 1 mM 4-azidobenzene diazonium tetrafluoroborate and 0.1 M supporting electrolyte tetraethylammonium tetrafluoroborate ($TEABF_4$) in acetonitrile. CIM carbon films were presoaked in the electrolyte for 1 h to ensure the electrolytes could diffuse into the mesopores, and bubbles were observed on the CIM carbon surface, indicating good electrolyte wetting. After presoaking, CIM carbon film was put on top of a gold electrode and mechanically held there using an electrode body.

To modify the CIM carbon surface, a potential scan of 0.2 V to −0.6 V (vs $Ag/Ag^+$ with 10 mM $Ag^+$) was applied to the CIM carbon film with a scan rate of 25 mV/s for 5 cycles. Azide-modified CIM carbon films were washed with acetonitrile and soaked in acetonitrile on a shaker overnight to remove physically absorbed unreacted diazonium salts. The click reaction was conducted by soaking azide-modified CIM carbon film overnight on a shaker in a $DMSO/H_2O$ solution containing 1 mM ethynylferrocene or cobalt tris(5-ethynyl-2,2'-bipyridine), 1 mM copper sulfate, 10 mM sodium ascorbate (to reduce Cu(II) to Cu(I) catalyst), and 1 mM tris(benzyltriazolylmethyl)amine as Cu(I) stabilizer. After reaction, CIM carbon film was thoroughly washed in DMSO, methanol, and soaked in methanol overnight.

Figure 8A:
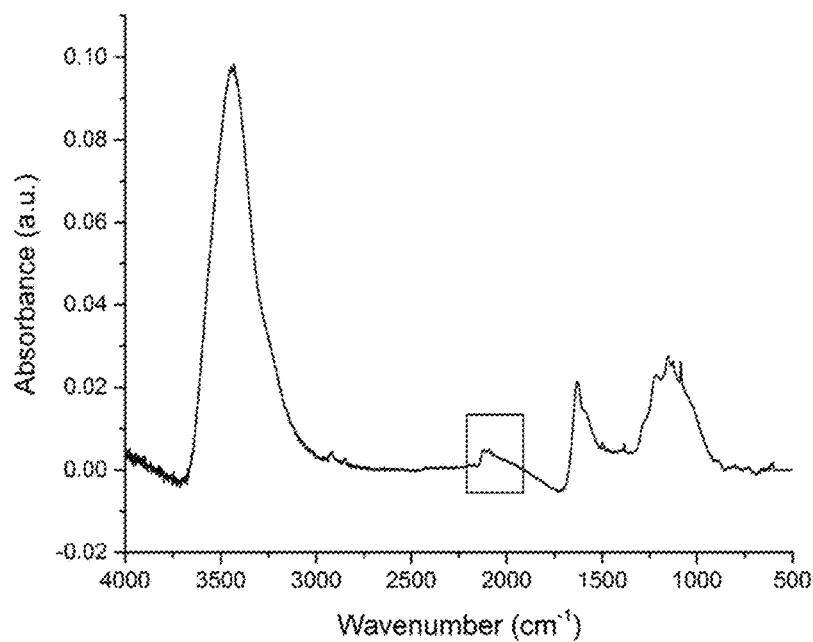
FIG. 8A is a graph of the IR spectral results obtained for the azide attachment to CIM carbon by electrochemical method (diazonium salt).

IR spectroscopy was used to detect the presence of azide groups on the CIM carbon film. Azide groups usually exhibit IR absorptions near 2100 $cm^{-1}$. As shown in FIG. 8A, the observed absorptions are at 2120 and 2093 $cm^{-1}$, in agreement with observations for previously reported azide-modified carbon nanofibers (2113 and 2083 $cm^{-1}$, Chem. Mater. 2009, 21, 724).

Figure 8B:
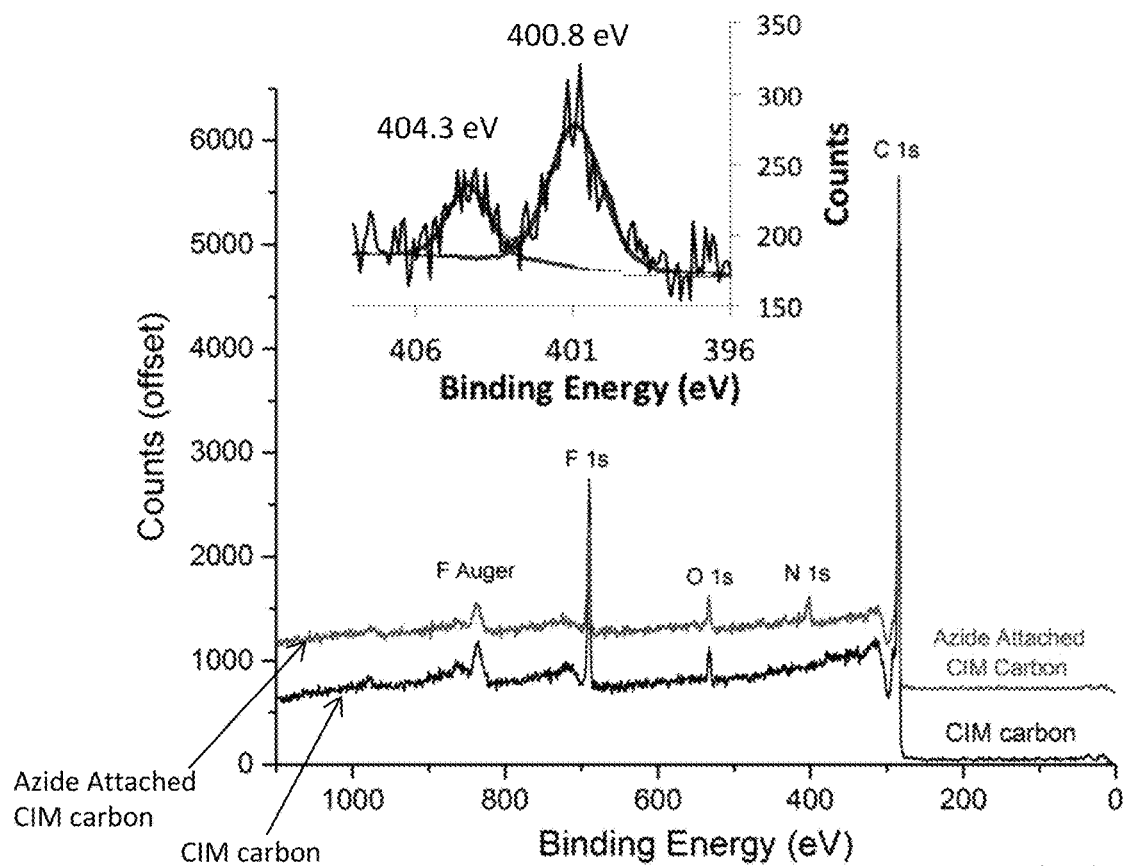
FIG. 8B is a graph of the XPS spectral results obtained for the azide attachment to CIM carbon.

XPS was also used to confirm the presence of azide on the CIM carbon surface. Compared to unmodified CIM carbon that does not contain nitrogen, a $N_{1s}$ peak appears in the survey scan of azide-modified CIM carbon as shown in FIG. 8B. By integrating the areas of the peaks in XPS, the nitrogen content was calculated to be 4.40 atom %, so that the surface loading of —$N_3$ was 1.47% with respect to all the atoms. As shown in the inset of FIG. 8B, the high-resolution $N_{1s}$ spectrum of azide-modified CIM carbon shows two peaks at 400.8 eV and 404.3 eV with an a real ratio of 70% to 30%. This $N_{1s}$ spectrum is characteristic for the azide group, and is consistent with previously reported azide attached to glassy carbon (400 eV and 404 eV, 2:1, J. Am. Chem. Soc. 2013, 135, 1110).

The observed fluorine, F, originates from the Teflon binder used to make the CIM carbon film.

Figure 9A:
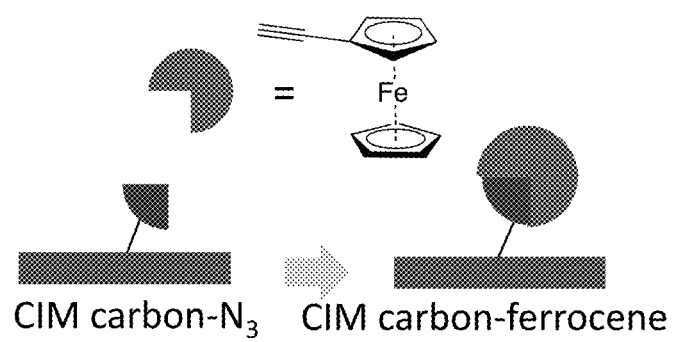
FIG. 9A is a schematic diagram of the attachment of ferrocene to CIM carbon using click chemistry.
Figure 9B:
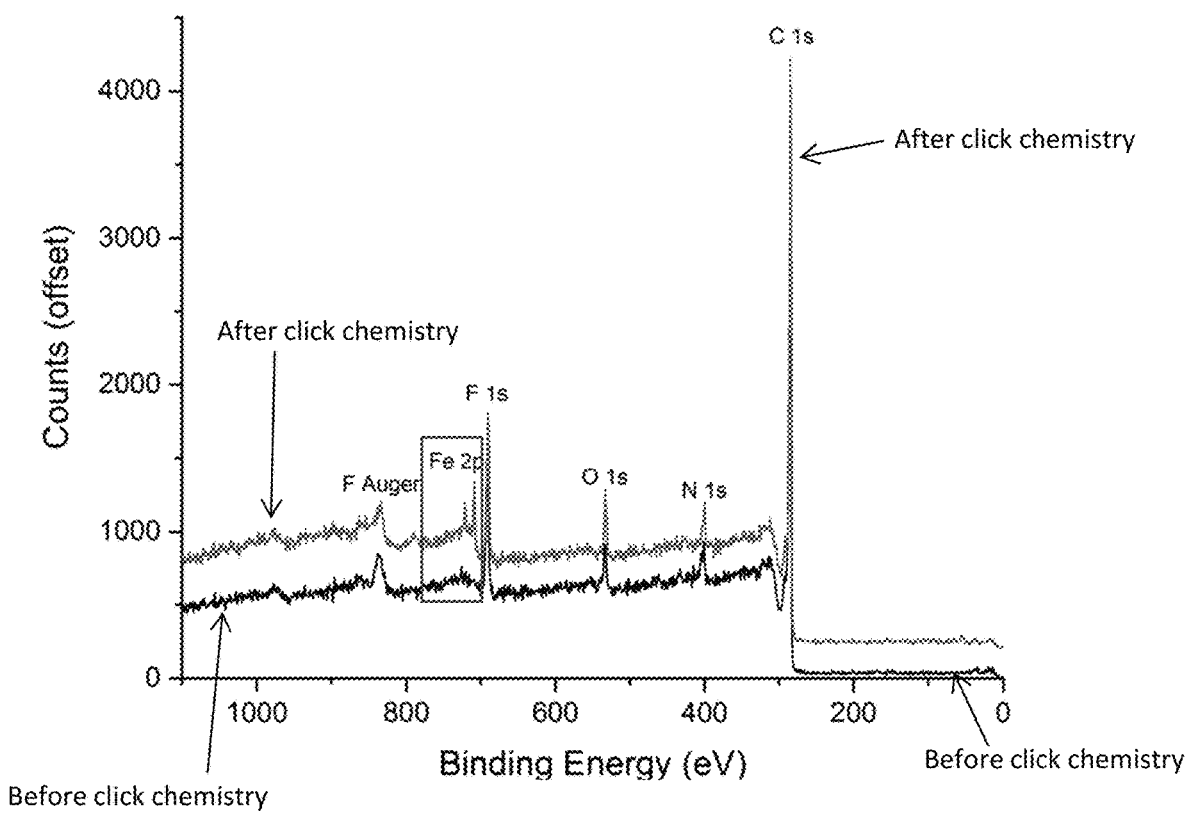
FIG. 9B is a graph of XPS spectral results obtained for ferrocene attached to CIM carbon using click chemistry.

Ferrocene Attachment to CIM Carbon—Ferrocene was first attached to CIM carbon using click chemistry as schematically represented in FIG. 9A. In the XPS survey scan as shown in FIG. 9B, Fe 2p peaks can be clearly observed, and from these data, the surface Fe content was calculated to be 0.65 atom %. If the reaction efficiency is 100%, the theoretical surface loading of ferrocene would equal the surface loading of —$N_3$ anchoring points, which is 1.47%.

Figure 9C:
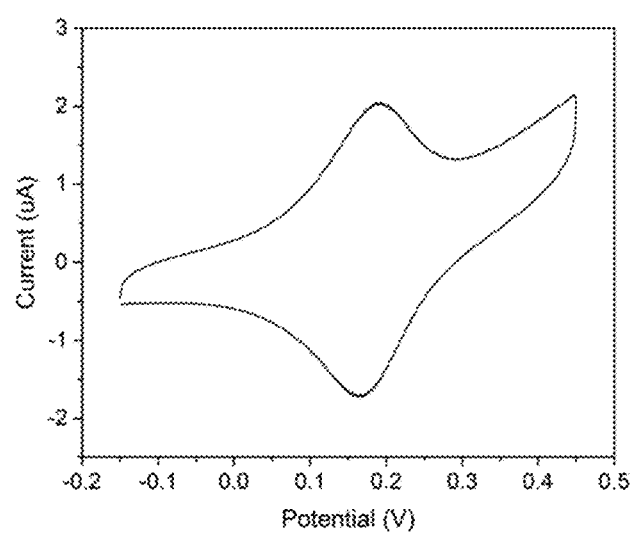
FIG. 9C is a plot of CV obtained for ferrocene attached to CIM carbon using click chemistry.

Using the same approach, ferrocene was also attached to a glassy carbon electrode. As shown in FIG. 9C, the resulting electrode shows well-defined surface-controlled redox activity.

These experiments demonstrate that it is feasible to attach a redox-active molecule to CIM carbon using click chemistry.

Figure 10A:
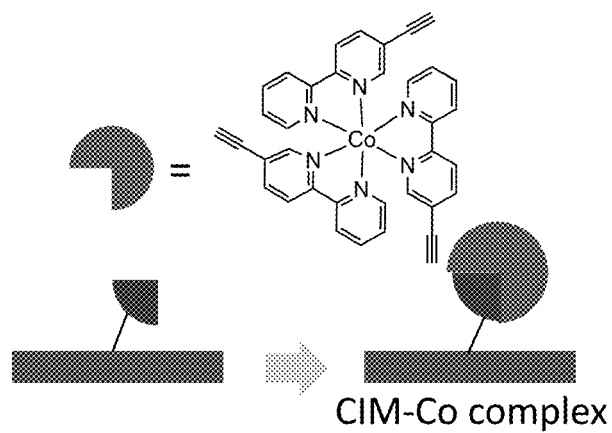
FIG. 10A is a schematic diagram of the attachment of cobalt tris(bipyridine) to CIM carbon.

Cobalt Tris(bipyridine) Attachment to CIM Carbon—Using the same click chemistry procedure employed for ferrocene, the cobalt complex cobalt(II) tris(5-ethynyl-2,2'-bipyridine) was attached to CIM carbon, as shown schematically in FIG. 10A. A cobalt complex without the ethynyl groups (necessary for click chemistry reaction) was used as a control.

Figure 10B:
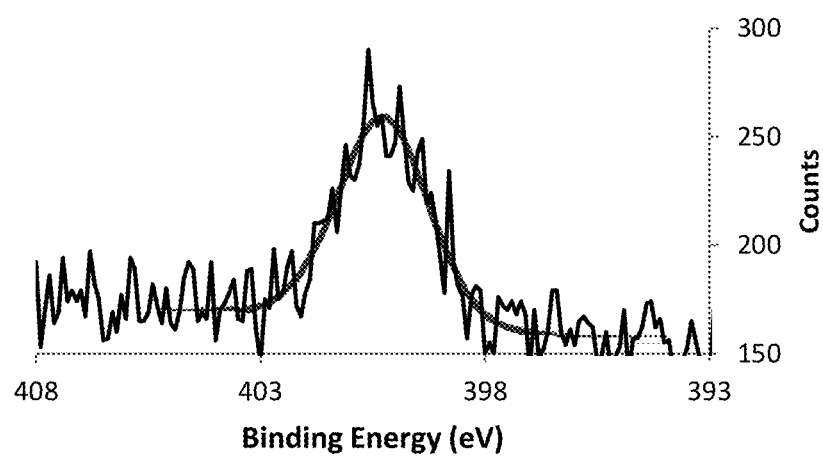
FIG. 10B is a graph of XPS spectral results obtained for cobalt tris(bipyridine) attachment to CIM carbon.
Figure 10C:
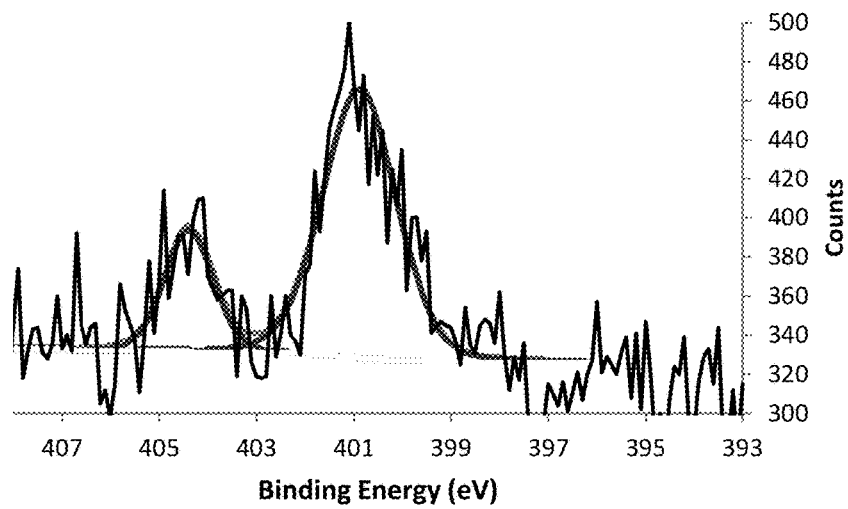
FIG. 10C is a graph of XPS spectral results obtained for control CIM carbon without attached cobalt tris(bipyridine).
Figure 10D:
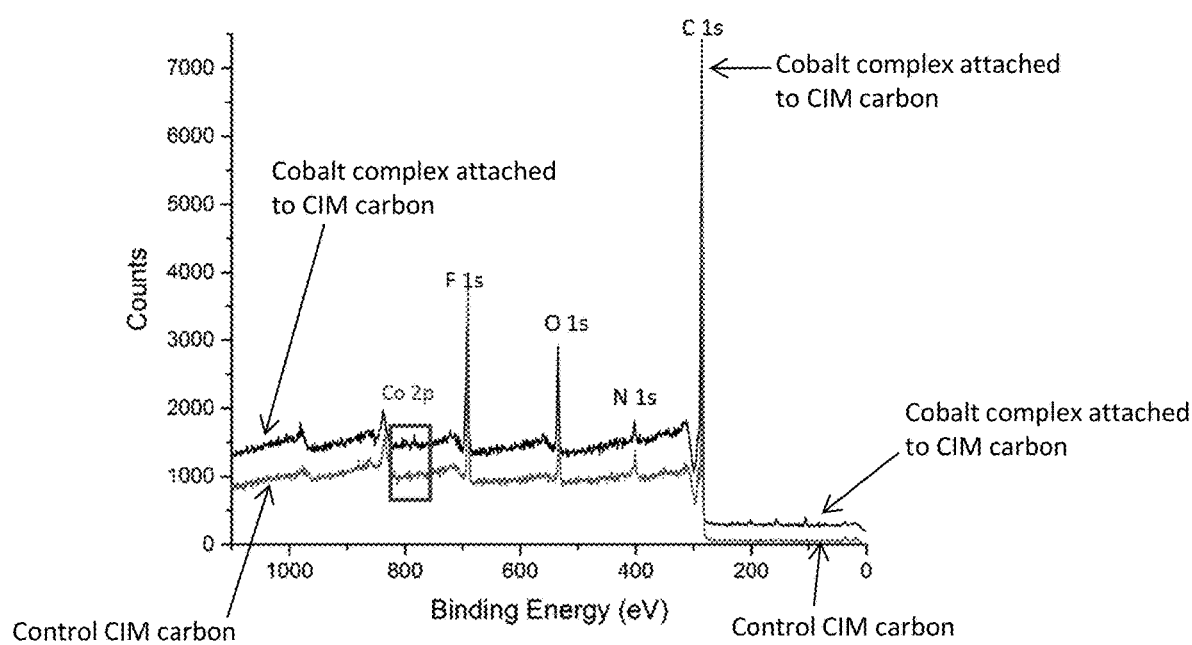
FIG. 10D is a graph of XPS spectral results obtained for control CIM carbon (bottom) and CIM carbon with attached cobalt tris(bipyridine) (top).

As shown in FIG. 10B, strong evidence from the XPS $N_{1s}$ spectrum was obtained showing the completion of the click chemistry between $CIM-N_3$ and cobalt(II) tris(5-ethynyl-2,2'-bipyridine). In the XPS $N_{1s}$ spectrum, $—N_3$ groups exhibit two peaks at 401 eV and 404 eV, and these two peaks become one broadened peak at 401 eV (triazole linkage) after the completion of click chemistry (*J. Am. Chem. Soc.* 2013, 135, 1110), as shown in FIG. 10C and FIG. 10D. This feature was observed on cobalt complex attached to CIM carbon, providing indirect evidence for the formation of triazole linkages.

The cobalt surface loading, however, is 0.05 atom %, which is lower than that of ferrocene attached using the same method. Also, the Cu(I) catalyst used in click chemistry could compete with Co to form a Cu complex with bipyridine ligands, which can affect the E° of the resulting electrode.

In summary, $—N_3$ groups were successfully attached to CIM carbon and used to anchor ferrocene through click chemistry. Cobalt(II) tris(5-ethynyl-2,2'-bipyridine) complex may be attached to CIM carbon, but with a lower surface loading.

Example 5-Redox Buffer Attachment Via Amide Coupling

CIM carbon films were obtained using the same procedure as described above for click chemistry. FIG. 11 is a schematic illustration of the amide coupling approach. For $—NO_2$ attachment, an electrolyte was prepared by dissolving 0.1 M 4-nitrobenzene diazonium tetrafluoroborate and 0.1 M supporting electrolyte tetraethylammonium tetrafluoroborate ($TEABF_4$) in acetonitrile. CIM carbon films were presoaked in the electrolyte for 1 h to ensure the electrolytes could diffuse into the mesopores. A potential scan of 0.5 V to −0.2 V (vs $Ag/Ag^+$ with 10 mM Age) was applied to the CIM carbon film with a scan rate of 25 mV/s for 5 cycles, and the modified CIM carbon films were washed with acetonitrile and soaked in acetonitrile on a shaker overnight to remove physically absorbed unreacted diazonium salts. To reduce $—NO_2$ to $—NH_2$ groups, $CIM-NO_2$ was soaked in a 0.8 M $Na_2S$ ethanol/$H_2O$ (1:1 v/v) solution at 50° C. overnight (*Langmuir* 2007, 23, 11074). The resulting $CIM-NH_2$ was washed thoroughly with ethanol and water using a shaker. Amide coupling between $CIM-NH_2$ and redox-active molecules with —COOH groups was performed using 4-(4,6-dimethoxy-1,3,5-triazin-2-yl)-4-methylmorpholinium chloride (DMTMM) or N-(3-dimethylaminopropyl)-N'-ethylcarbonate/1-hydroxybenzotriazole (EDC/HOBt) as the coupling reagents.

Figure 12A:
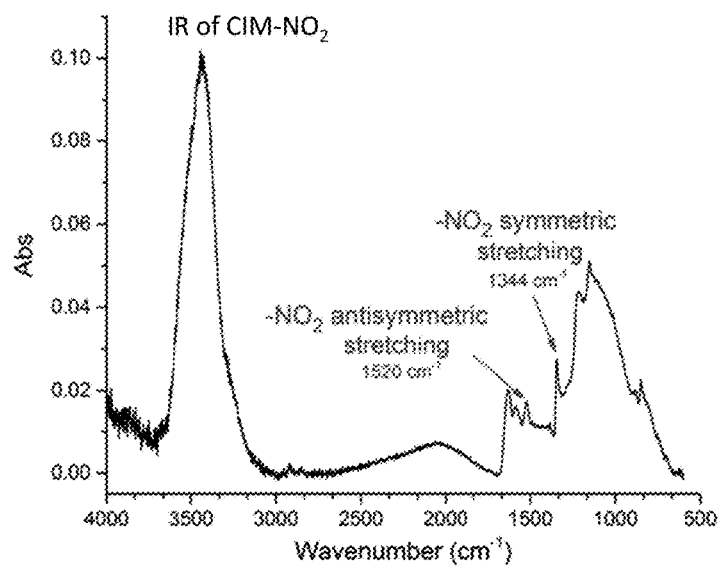
FIG. 12A is a graph of the IR spectral results obtained for the —$NO_2$ group attachment to CIM carbon.
Figure 12B:
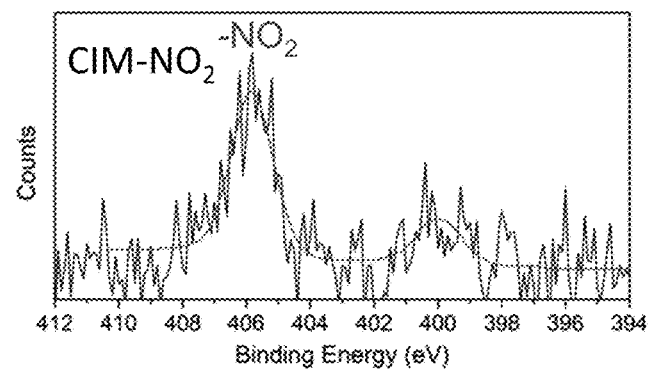
FIG. 12B is a graph of the XPS spectral results obtained for the —$NO_2$ group attachment to CIM carbon.
Figure 12C:
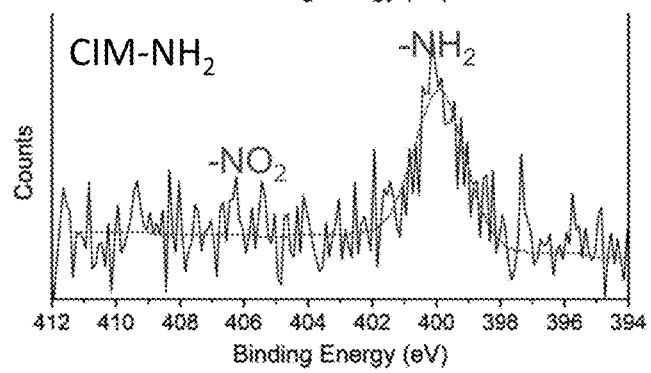
FIG. 12C is a graph of the XPS spectral results obtained for the —$NH_2$ group attachment to CIM carbon.

The successful attachment of $—NO_2$ groups on the surface of CIM carbon is evidenced by the IR absorptions at 1520 and 1344 $cm^{-1}$ (vs reported values of 1520 and 1340 $cm^{-1}$) as shown in FIG. 12A. Also the absence of an $N_2$ absorption in the range of 2130-2300 $cm^{-1}$ indicates that the observed nitro groups are covalently attached rather than physically absorbed (*Chem. Soc. Rev.* 2011, 40, 3995, *Chem. Soc. Rev.* 2005, 34, 429). The nitrogen surface loading was estimated to be 1.6 atom % on the basis of XPS data. As shown in FIG. 12B, a strong peak at 406 eV is observed in the $N_{1s}$ spectrum, which is characteristic for $—NO_2$ groups. As shown in FIG. 12C, $CIM-NO_2$ was successfully reduced to $CIM-NH_2$ using $Na_2S$ as a reducing agent. After the reduction, the $N_{1s}$ peak at 406 eV disappeared and a peak at 400 eV was observed, corresponding to $—NH_2$ groups (*Langmuir* 2007, 23, 11074) as shown in FIG. 12C.

Ferrocene attachment to CIM carbon—As illustrated schematically in FIG. 13A, Ferrocene was attached to CIM carbon through an amide coupling reaction using DMTMM as the coupling reagent. $CIM-NH_2$ films were soaked in a methanol solution of 2 mM of COOH-ferrocene and 2 mM of DMTMM for 24 h. For a control experiment, the same solution without DMTMM coupling reagent was used to treat $CIM-NH_2$ films.

As shown in FIG. 13B, an XPS survey scan shows Fe 2p peaks, from which the surface loading of Fe on the CIM carbon sample was estimated to be 1.05 atom %. Using the same approach described above, ferrocene was also attached to a glassy carbon electrode. The resulting electrode shows well-defined surface-controlled redox activity as seen in FIG. 13C. These experiments demonstrate that it is feasible to attach a redox-active molecule to CIM carbon using the amide coupling reaction.

Figure 14A:
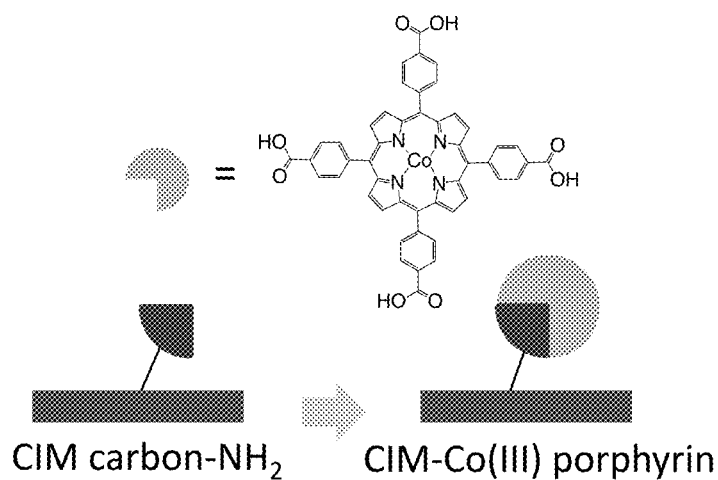
FIG. 14A is a schematic diagram of cobalt porphyrin attachment to CIM carbon by amide coupling.

Cobalt(III) Porphyrin Attachment To CIM Carbon—The same amide coupling conditions were used to attach a cobalt(III) meso-tetra(4-carboxyphenyl)porphyrin complex to CIM carbon, as shown schematically in FIG. 14A. For a demonstration, the amide coupling between cobalt(III) meso-tetra(4-carboxyphenyl)porphyrin and aniline was performed in a homogenous solution phase, and the reaction proceeded well based on NMR analysis.

Figure 14B:
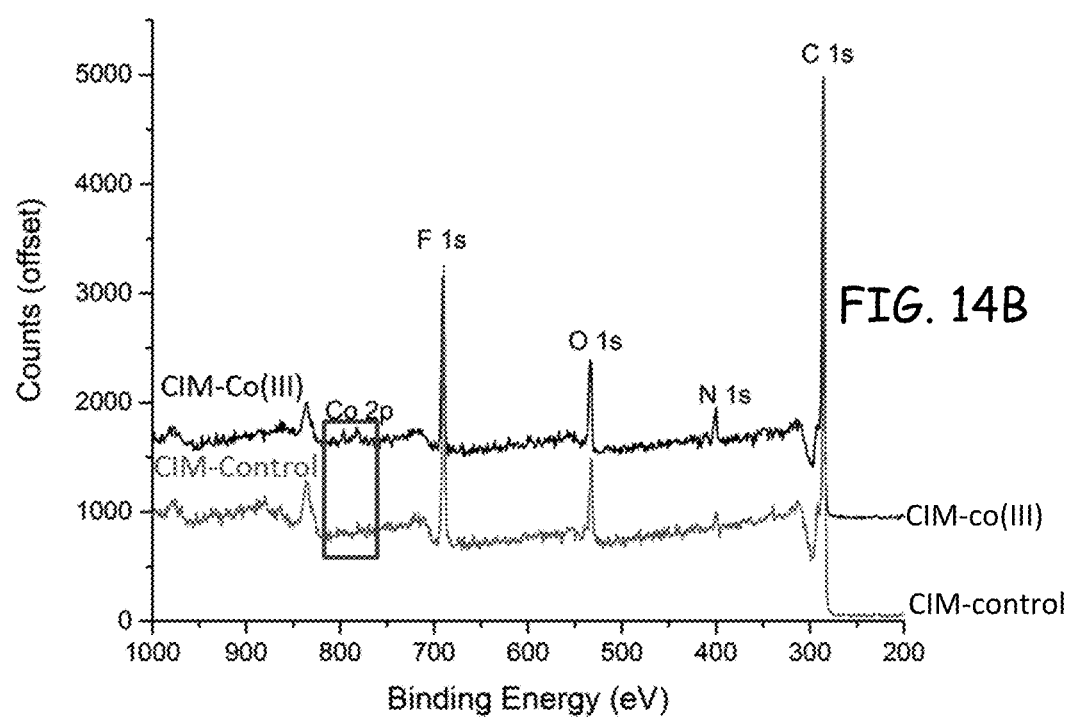
FIG. 14B is a graph of XPS spectral results of coupling between CIM-$NH_2$ and cobalt(III) meso-tetra (4-carboxyphenyl) porphyrin.

For the amide coupling between $CIM-NH_2$ and cobalt(III) meso-tetra(4-carboxyphenyl)porphyrin on the surface, XPS shows a low cobalt surface loading of 0.3 atom %, and no Co was detected from the control experiment without the coupling reagent. See FIG. 14B and Table 3.

TABLE 3

|  | CIM-CoTCPP | CIM-Control |
|---|---|---|
| C 1s | 80.16% | 79.26% |
| N 1s | 3.62% | 2.14% |
| O 1s | 6.59% | 4.32% |
| F 1s | 9.34% | 14.28% |
| Co 2p3 | 0.30% | NA |

A reported mechanism of the DMTMM-catalyzed amide coupling reaction reveals that the —COOH groups have to be deprotonated by $—NH_2$ groups for the reaction to proceed (Tetrahedron 1999, 55, 13159). In the current system, $—NH_2$ groups are on the surface of CIM carbon so that they may not be readily available for —COOH groups to be deprotonated. Therefore, bases (NaOH and N,N-diisopropylethylamine, or DIPEA) were added to the reaction to assist the deprotonation of the —COOH groups. The resulting cobalt surface loading, however, remained in the range of 0.15 to 0.30 atom %, which is consistent with the results obtained without the additional bases shown in FIG. 15 and Table 4.

TABLE 4

|  | 0.1 mM DIPEA | 0.5 mM DIPEA | 0.1 mM NaOH | 0.5 mM NaOH |
|---|---|---|---|---|
| C 1s | 80.46% | 72.46% | 81.88% | 80.80% |
| N 1s | 1.16% | 2.56% | 1.33% | 2.35% |
| O 1s | 7.53% | 8.05% | 7.31% | 6.20% |
| F 1s | 10.67% | 16.64% | 9.32% | 10.38% |
| Co 2p3 | 0.18% | 0.28% | 0.16% | 0.27% |

Figure 16A:
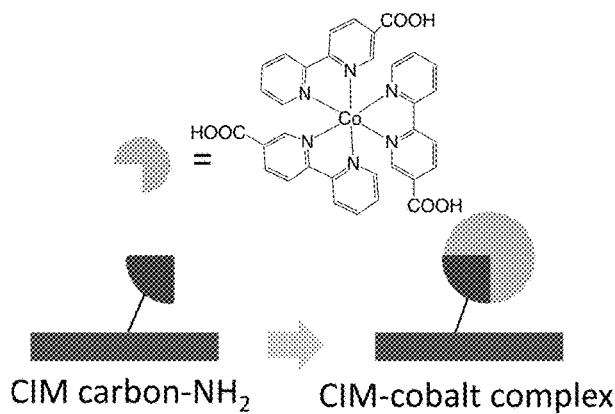
FIG. 16A is a schematic diagram of cobalt tris(bipyridine) attachment to CIM carbon by amide coupling.
Figure 16B:
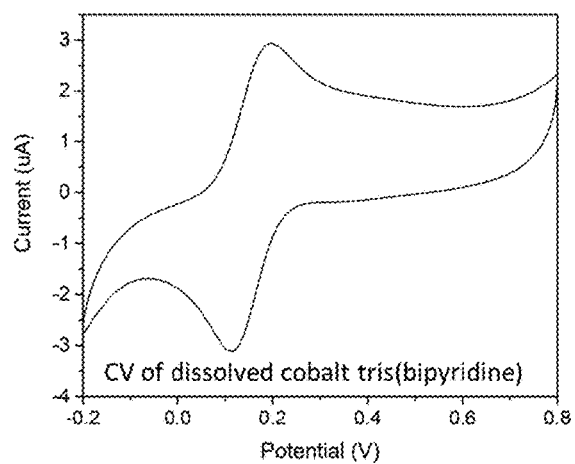
FIG. 16B is a plot of a CV of dissolved cobalt tris (bipyridine).
Figure 16C:
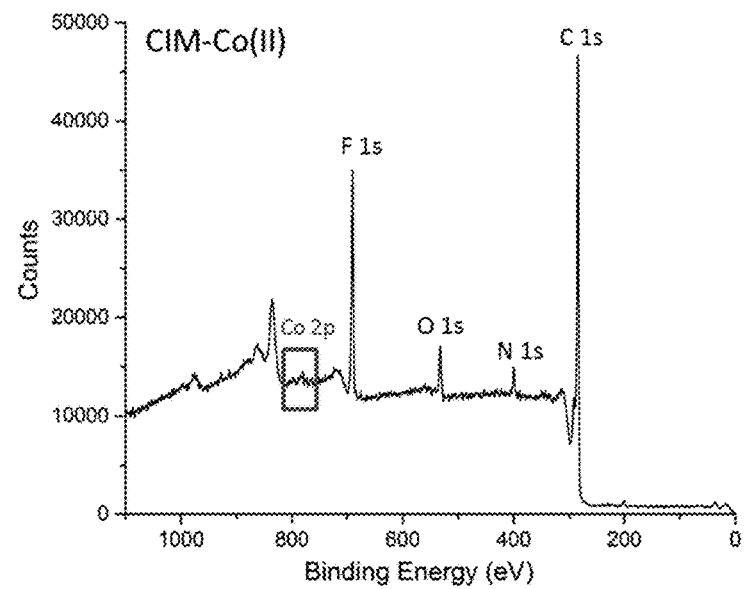
FIG. 16C is a graph of XPS spectral results of coupling between cobalt tris(bipyridine) attachment to CIM carbon by amide coupling.

Besides cobalt porphyrin, cobalt tris(5-carboxy-2,2'-bipyridine) was also evaluated, as shown schematically in FIG. 16A. Both cobalt(II) and cobalt(III) tris(bipyridine) are stable and exhibit well-defined and reversible redox activity as seen in FIG. 16B. To perform amide coupling between cobalt(II) tris(5-carboxy-2,2'-bipyridine) and CIM-NH2, the CIM-NH2 film was soaked for 24 h in a DMF solution containing 2 mM of cobalt(II) tris(5-carboxy-2,2'-bipyridine) chloride, 2 mM of EDC-HCl, 2 mM of HOBt, and 2 mM of DIPEA. The resulting carbon films were washed with DMF and ethanol extensively with the assistance of a shaker. An XPS survey scan shown in FIG. 16C reveals that the cobalt surface loading obtained by this approach is 0.20 atom %, which is on a similar level as for cobalt(III) porphyrin but lower than that of ferrocene.

Figure 17A:
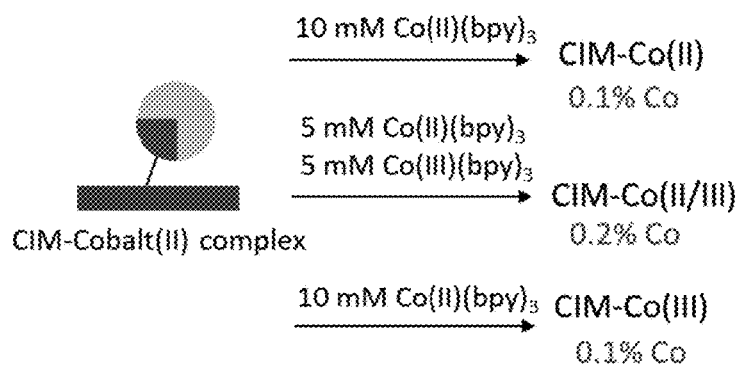
FIG. 17A is a schematic diagram of the tuning of the interfacial potential of the CIM carbon by soaking CIM-Co films in different solutions of Co(II) and Co(III).

The surface cobalt oxidation states were tuned by soaking the CIM-Co films described above in FIG. 16A in solutions containing different ratios of cobalt(II) and cobalt(III) tris(bipyridine) complexes. (i.e., 10 mM Co(II) tris(bipyridine), 5 mM Co(II) tris(bipyridine)+5 mM Co(III) tris(bipyridine), and 10 mM Co(III) tris(bipyridine)). See FIG. 17A. The resulting CIM carbon films were thoroughly washed in DMF, ethanol and methanol with the assistance of a shaker. XPS results (data not shown) reveal that the obtained CIM carbon films have cobalt surface loadings in the range of 0.1-0.2%.

The open circuit potentials of the CIM carbon films with different surface cobalt oxidation states were tested with an electrolyte containing 0.1 M of tetraethylammonium tetrafluoroborate in acetonitrile. For each sample (i.e., CIM-Co(II), CIM-Co(II/III) and CIM-Co(III)), two individual films were prepared and tested.

Figure 17B:
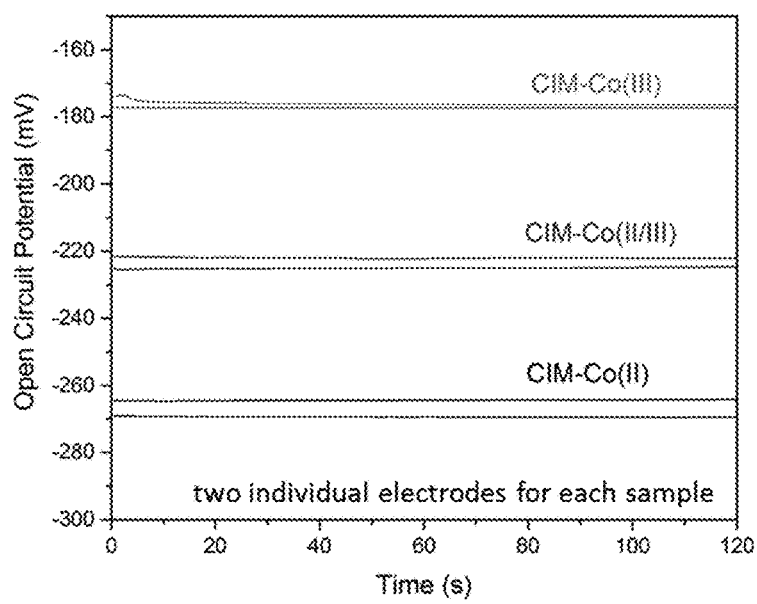
FIG. 17B and FIG. 17C are plots of the open circuit potentials for modified CIM carbon films with different ratios of Co(II) and Co(III).
Figure 17C:
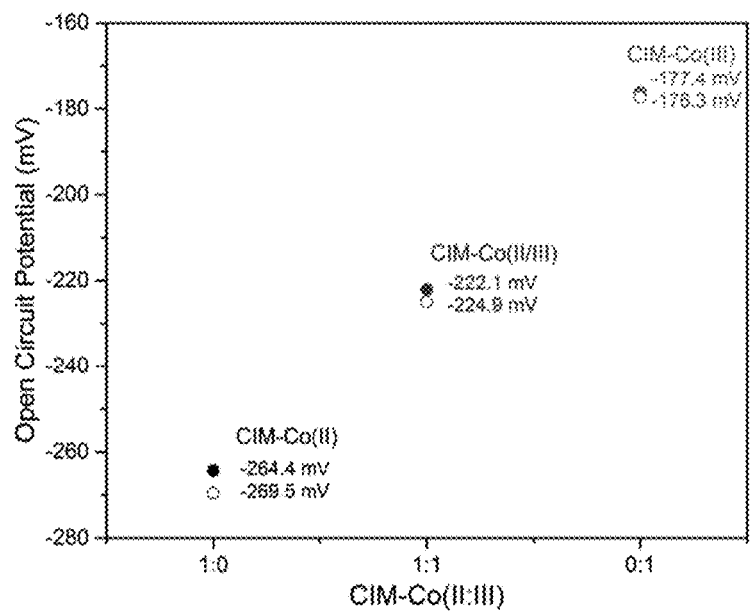

All the CIM carbon films exhibit stable open circuit potentials as shown in FIG. 17B. The CIM-Co(II) films exhibit an average potential of −267.0 mV, CIM-Co(III) films exhibit an average potential of −176.8 mV and CIM-Co(II/III) films exhibit an average potential of −223.5 mV as shown in FIG. 17C. This demonstrates that the open circuit potential of CIM carbon films can be controlled by the surface cobalt oxidation states.

It should be noted that the surface cobalt in this experiment might be physically adsorbed. A control experiment of physically absorbed redox buffer was performed by soaking pristine (i.e., unmodified) CIM carbon films in a solution containing 5 mM Co(II) tris(bipyridine)+5 mM Co(III) tris(bipyridine) and thoroughly washing the films. The potential difference between the control CIM carbon film with physically absorbed redox buffer and the CIM carbon redox buffer prepared through amide coupling is 9.0 mV. Therefore it is possible that the redox buffer might be physically absorbed. By increasing the cobalt loading (>1 atom %) through covalent attachment, the effects of physically absorbed redox buffer can be minimized and neglected.

In summary, —NO$_2$ and —NH$_2$ groups can be successfully introduced to the surface of CIM carbon for subsequent amide coupling. The ferrocene derivative can be attached to CIM carbon with a high surface loading (1.05 atom %), whereas the cobalt tris(bipyridine) complex may be attached with a low surface loading. High cobalt surface loading is needed for better E° reproducibility.

Example 6—K$^+$ Sensors with Plasticized PVC Membrane

K$^+$ sensors were fabricated with CIM-Co(II/III) films and plasticized PVC membranes. The membranes contain typical components of a K$^+$-ISE membrane, with valinomycin as the ionophore and potassium tetrakis(4-chlorophenyl) borate as ionic sites.

Figure 18A:
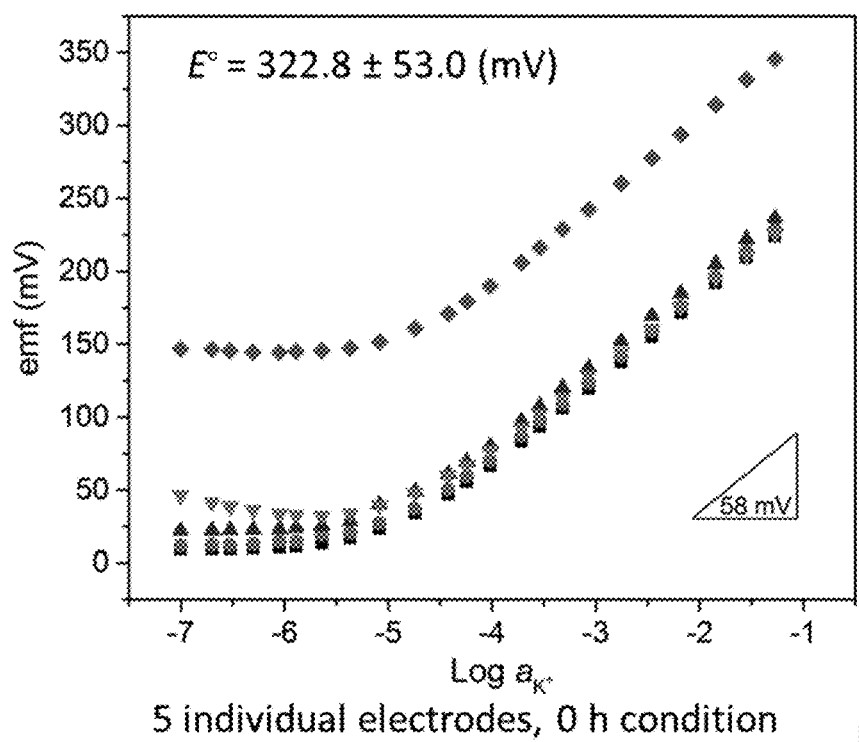
FIG. 18A are plots showing the $K^+$ calibration curves for 5 electrodes with a plasticized PVC membrane.
Figure 18B:
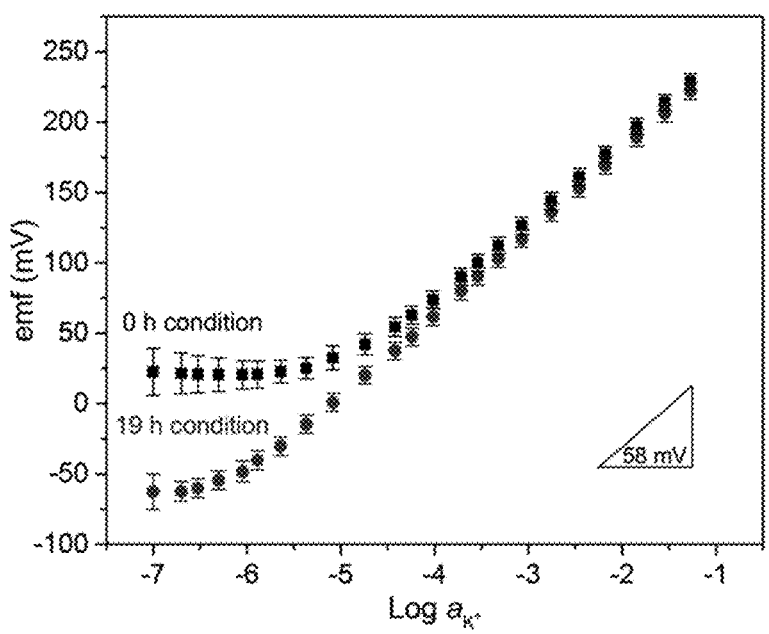
FIG. 18B are plots showing the $K^+$ calibration curves for 4 electrodes with a plasticized PVC membrane before and after conditioning for 19 hours.

5 individual electrodes were prepared and tested without any preconditioning (i.e., soaking the electrodes in a 1 mM KCl solution). FIG. 18A shows individual calibration curves of the 5 electrodes, and the E° is 322.8±53.0 (mV). If one excludes the electrode shown by diamonds that could exhibit an E° shift due to variations in manual fabrication, the resulting 4 electrodes have an E° of 299.3±7.0 mV. After 19 h conditioning, the electrode E° remains stable and is 296.9±6.9 mV. See FIG. 18B and Table 5. The standard deviation of E° (i.e., 7.0 mV and 6.9 mV) is very similar to previous results of CIM carbon ISEs without redox buffer (i.e., 7.3 mV, Anal. Chem. 2014, 86, 7111).

TABLE 5

|  | 0 h condition | 19 h condition |
|---|---|---|
| Slope (mV/dec.) | 56.1 ± 1.6 | 58.7 ± 1.0 |
| E° (mV) | 299.3 ± 7.0 | 296.9 ± 6.9 |

Previous CIM carbon K$^+$-ISEs without redox buffer[1]: E° = 58.8 ± 7.3 mV

Example 7—Synthesis of Cobalt Terpyridine Complex in Redox Buffer

A cobalt terpyridine complex was evaluated for use in a redox buffer. Terpyridine contains 3 nitrogens to bind with cobalt. This can result in stronger binding than bipyridine with 2 nitrogens.

Figure 20:
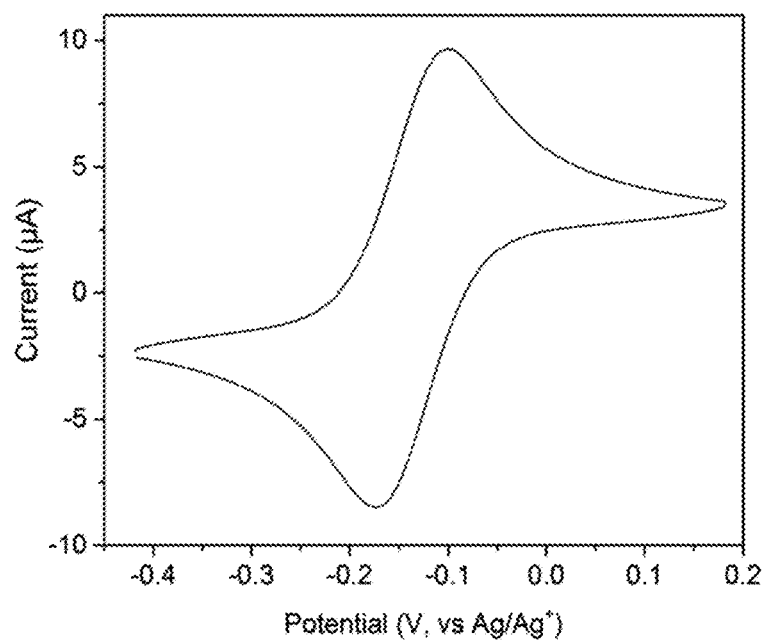
FIG. 20 is a plot of CV of dissolved cobalt(II) bis(terpyridine) complex.

Cobalt(II) bis(terpyridine) complex was successfully synthesized as shown in FIG. 19. 30 mg of CoCl2 6H2O was dissolved in 200 uL of water and added into a 10 mL methanol solution containing 59 mg of 2,2':6',2''-terpyridine at room temperature. Then 250 mg of lithium tetrakis (pentafluorophenyl)borate (LiTPFPB) ethyl etherate was added into the solution. The CV of dissolved cobalt(II) bis(terpyridine) complex gives an E° of −0.1369 V (vs Ag/Ag+) and a peak separation of 73 mV, which is close to the theoretical expectation for a redox couple with fast electron transfer kinetics, as shown in FIG. 20. It is therefore suitable for the redox buffer application.

Figure 21A:
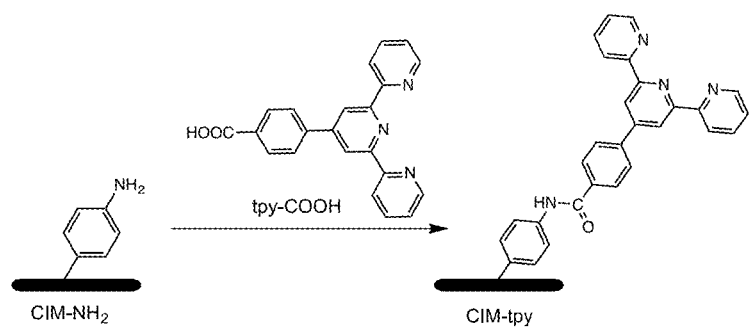
FIG. 21A is a schematic diagram for coupling terpyridine ligand to CIM carbon.
Figure 21B:
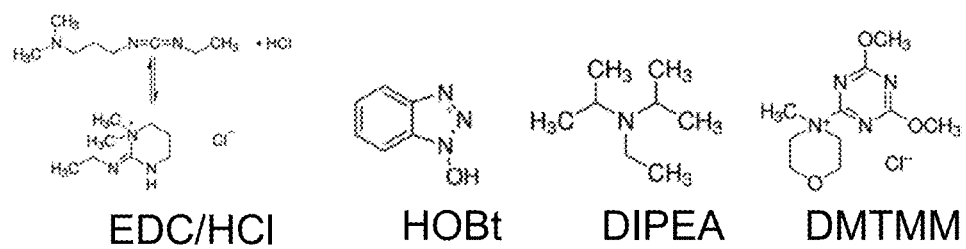
FIG. 21B shows typical compounds that catalyze the amide coupling of the terpyridine ligand with a carboxylic acid substituent to the aniline-modified CIM carbon.
Figure 21C:
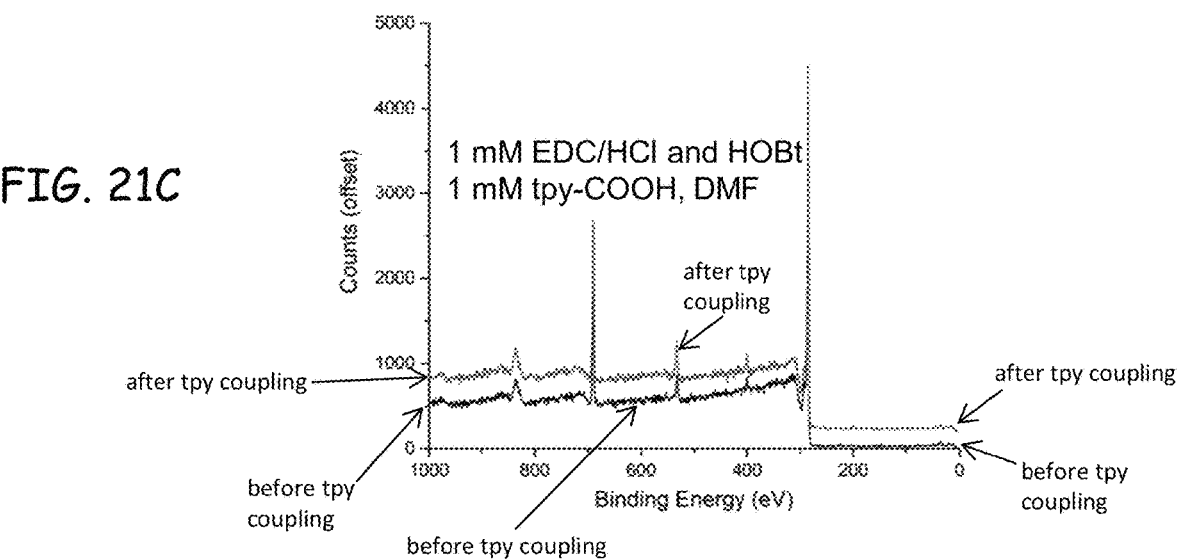
FIG. 21C shows a graph of XPS spectral results before and after terpyridine coupling with different combinations and concentrations of compounds that catalyze the attachment of the terpyridine ligand with a carboxylic acid substituent to the aniline-modified CIM carbon.
Figure 22A:
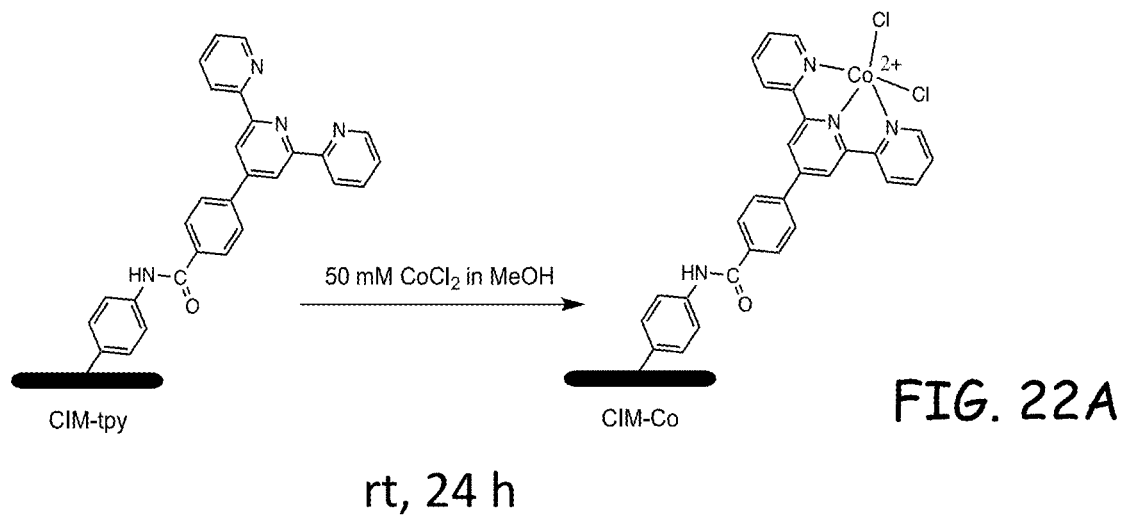
FIG. 22A is a diagram showing a method to bind cobalt to the surface of terpyridine-modified CIM carbon.
Figure 22B:
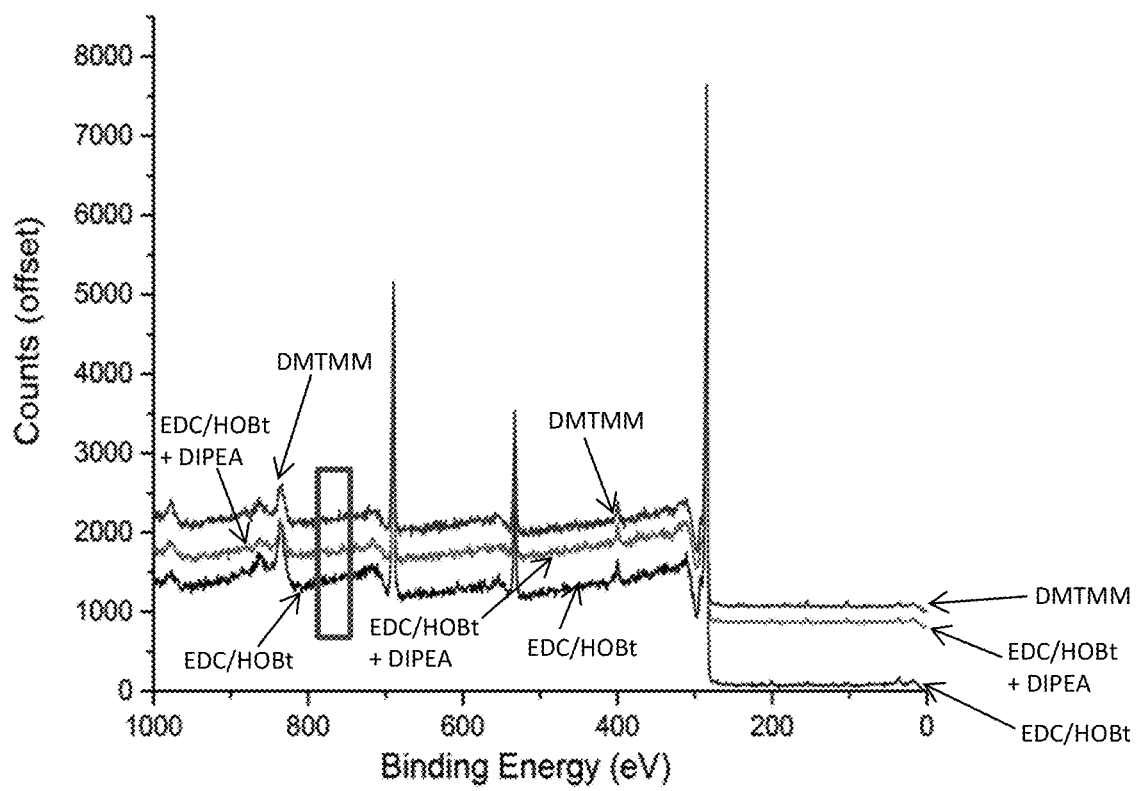
FIG. 22B is a graph of XPS spectral results for testing the cobalt binding to the surface of CIM carbon.

A terpyridine ligand with a carboxyphenyl substituent was attached to the surface of amino-functionalized CIM carbon as shown in FIG. 21A using an amide linker. Formation of the amide bond from the amino group on the CIM carbon and the carboxyl group of the ligand was catalyzed using reagents shown in FIG. 21B. FIG. 21C shows graphs of XPS spectral results before and after terpyridine coupling with different combinations and concentrations of the reagents used to catalyze the attachment of the terpyridine ligand with a carboxylic acid substituent to the aniline-modified CIM carbon. Tables 6, 7 and 8, show the elemental composition of the surfaces prior as determined by XPS and shown in FIG. 21C. The data confirm that the reaction conditions for FIG. 21C are the best among the three, with the high nitrogen concentration confirming the presence of the terpyridine ligand. Co was bound to the covalently attached terpyridine ligand as shown in FIG. 22A. FIG. 22B is a graph of XPS spectral results that show cobalt binding to the surface of CIM carbon.

TABLE 6

|      | Before coupling | After coupling |
|------|-----------------|----------------|
| C 1s | 86.09%          | 81.69%         |
| N 1s | 1.03%           | 2.92%          |
| O 1s | 2.90%           | 3.59%          |
| F 1s | 9.98%           | 11.80%         |

TABLE 7

|      | Before coupling | After coupling |
|------|-----------------|----------------|
| C 1s | 86.51%          | 84.08%         |
| N 1s | 1.52%           | 1.62%          |
| O 1s | 1.89%           | 3.31%          |
| F 1s | 10.09%          | 10.99%         |

TABLE 8

|      | Before coupling | After coupling |
|------|-----------------|----------------|
| C 1s | 84.08%          | 82.62%         |
| N 1s | 1.30%           | 1.08%          |
| O 1s | 2.79%           | 4.78%          |
| F 1s | 11.83%          | 11.52%         |

Coupling Terpyridine Ligand to CIM Carbon—After the amide coupling reactions to attach the terpyridine ligand, a cobalt complexation reaction was performed by soaking the modified CIM carbon films in 50 mM $CoCl_2$ solutions for 24 hours. After extensive washing to remove physically absorbed cobalt, no apparent cobalt peaks were observed by XPS. Although the present description has been described with reference to some embodiments, workers skilled in the art will recognize that changes may be made in form and detail without departing from the spirit and scope of the description.

What is claimed is:

1. A solid-contact (SC)-electrode comprising a solid electron conductor, an interlayer, a membrane and a molecular redox buffer, wherein the interlayer comprises nanoporous carbon and is located between the solid electron conductor and the membrane, wherein the nanoporous carbon is modified by a reactive functional group selected from the group consisting of azide (—$N_3$), thiol (—SH), trichlorosilane, and alkoxysilane, wherein the molecular redox buffer comprises a metal ion redox couple, the metal ion redox couple comprising a reduced species and an oxidized species, wherein the reduced species and the oxidized species of the molecular redox buffer are covalently attached to the nanoporous carbon in the interlayer through the reactive functional group.

2. The SC-electrode of claim 1, wherein the nanoporous carbon is colloid-imprinted mesoporous (CIM) carbon.

3. The SC-electrode of claim 2, wherein the CIM carbon is soaked and electrochemically modified in the presence of a diazonium compound.

4. The SC-electrode of claim 1, wherein the molecular redox buffer comprises complexes with pyridines, bipyridines, terpyridines, porphyrins, phthalocyanines, phenanthrolines, acetylacetones, bipyridylimino isoindolines, crown ethers, cryptands and combinations thereof.

5. The SC-electrode of claim 1, wherein the metal ion redox couple is selected from $Co^{2+}/Co^{3+}$, $Os^{2+}/Os^{3+}$, $Fe^{2+}/Fe^{3+}$, $Cu^+/Cu^{2+}$, $Ni^{2+}/Ni^{3+}$, $Mn^{2+}/Mn^{3+}$, $Cr^{2+}/Cr^{3+}$, $Ru^{2+}/Ru^{3+}$, $Mo^{4+}/Mo^{5+}$, $Ag^+/Ag^{2+}$, $Ag^{2+}/Ag^{3+}$, $Sn^{2+}/Sn^{4+}$, $Pb^{2+}/Pb^{4+}$ and $Ir^{2+}/Ir^{3+}$.

6. The SC-electrode of claim 1, wherein the linkages formed between the reactive functional group and the molecular redox buffer are ester linkages, amide linkages, carbon-carbon linkages or carbon-silicon linkages.

7. The SC-electrode of claim 1, wherein the solid electron conductor is selected from gold, platinum, silver, copper, steel, carbon, nickel, brass, indium-tin-oxide (ITO), fluorine-doped tin oxide (FTO), aluminum and combinations thereof.

8. The SC-electrode of claim 1, wherein the molecular redox buffer is synthesized as a diazonium salt.

9. The SC-electrode of claim 1, wherein the electrode is incorporated within an electrochemical sensor system comprising two or more electrodes.

10. The SC-electrode of claim 9, wherein the electrochemical sensor system measures analytes selected from $H^+$, $Li^+$, $Na^+$, $K^+$, $Mg^{2+}$, $Ca^{2+}$, $Cu^{2+}$, $Ag^+$, $Zn^{2+}$, $Cd^{2+}$, $Hg^{2+}$, $Pb^{2+}$, $NH_4^+$, carbonate, bicarbonate, nitrate, nitrite, sulfide, phosphate, chloride, iodide, perfluoroalkylsulfonates, perfluoroalkanoates and combinations thereof.

11. The SC-electrode of claim 9, wherein at least one of the electrodes in the electrochemical sensor system is a solid-contact reference electrode, and wherein the membrane in the reference electrode is a reference membrane.

12. The SC-electrode of claim 9, wherein at least one of the electrodes is a solid-contact ion-selective electrode, and wherein the membrane in the ion-selective electrode is an ion-selective membrane.

13. The SC-electrode of claim 9, wherein the system is a wearable system, an implantable system, a printed system, a paper-based system or combinations thereof.

14. A method of making an electrochemical sensor system, the method comprising:
    forming a solid-contact (SC)-electrode comprising a solid electron conductor, an interlayer, a membrane and a molecular redox buffer, wherein the interlayer comprises nanoporous carbon and is located between the solid electron conductor and the membrane, wherein the nanoporous carbon is modified by a reactive functional group selected from the group consisting of azide (—$N_3$), thiol (—SH), trichlorosilane, and alkoxysilane, wherein the molecular redox buffer comprises a metal ion redox couple, the metal ion redox couple comprising a reduced species and an oxidized species and wherein the reduced species and the oxidized species of the molecular redox buffer are covalently attached to the nanoporous carbon in the interlayer through the reactive functional group.

15. The method of claim 14, wherein the nanoporous carbon interlayer is the colloid-imprinted mesoporous (CIM) carbon interlayer.

16. The method of claim 14, wherein the metal ion redox couple is selected from $Co^{2+}/Co^{3+}$, $Os^{2+}/Os^{3+}$, $Fe^{2+}/Fe^{3+}$, $Cu^+/Cu^{2+}$, $Ni^{2+}/Ni^{3+}$, $Mn^{2+}/Mn^{3+}$, $Cr^{2+}/Cr^{3+}$, $Ru^{2+}/Ru^{3+}$, $Mo^{4+}/Mo^{5+}$, $Ag^+/Ag^{2+}$, $Ag^{2+}/Ag^{3+}$, $Sn^{2+}/Sn^{4+}$, $Pb^{2+}/Pb^{4+}$ and $Ir^{2+}/Ir^{3+}$.

17. The method of claim 14, wherein linkages formed between the reactive functional group and the molecular redox buffer are ester linkages, amide linkages, carbon-carbon linkages or carbon-silicon linkages.

18. The method of claim 14, wherein the molecular redox buffer complex is synthesized prior to coupling to the conductor, the interlayer or the membrane.

19. The method of claim 14, wherein the molecular redox buffer is synthesized on the interlayer with a reactive functional group from reactant monomers.

20. A method of measuring an analyte in a sample comprising:

contacting an ion-selective electrode in an electrochemical system with a sample, the electrochemical system comprising at least one solid-contact (SC)-electrode, wherein the SC-electrode comprises a solid electron conductor, an interlayer, a membrane and a molecular redox buffer, wherein the interlayer comprises nanoporous carbon and is between the conductor and the membrane, wherein the nanoporous carbon is modified by a reactive functional group selected from the group consisting of azide (—$N_3$), thiol (—SH), trichlorosilane, and alkoxysilane, wherein the molecular redox buffer comprises a metal ion redox couple, the metal ion redox couple comprising a reduced species and an oxidized species and wherein the reduced species and the oxidized species of the molecular redox buffer are covalently attached to the nanoporous carbon in the interlayer through the reactive functional group.

21. The method of claim 20, wherein the electrochemical sensor system comprises at least two SC-electrodes, and wherein at least one of the SC-electrodes comprises the ion-selective electrode or the reference electrodes.

22. The method of claim 20, wherein the sample is a clinical sample, an industrial sample, a forensic sample, an agricultural sample, a residential sample, a bodily fluid sample, or an environmental sample.

23. The method of claim 20, wherein the electrochemical system comprises a sensor, wherein the sensor is a potentiometric sensor, ion-sensitive field effect transistor, a voltammetric sensor, an amperometric sensor, a coulometric sensor, or an impedance sensor.

24. The method of claim 20, wherein the method further comprises correlating the results from the sensor to determine the quantity or concentration of the analyte.

25. The method of claim 20, wherein the analyte measured is selected from $H^+$, $Li^+$, $Na^+$, $K^+$, $Mg^{2+}$, $Ca^{2+}$, $Cu^{2+}$, $Ag^+$, $Zn^{2+}$, $Cd^{2+}$, $Hg^{2+}$, $Pb^{2+}$, $NH_4^+$, carbonate, bicarbonate, nitrate, nitrite, sulfide, phosphate, chloride, iodide, perfluoroalkylsulfonates, perfluoroalkanoates and combinations thereof.

* * * * *